(12) United States Patent
Wenger et al.

(10) Patent No.: US 8,555,851 B2
(45) Date of Patent: Oct. 15, 2013

(54) LUBRICATION ARRANGEMENT FOR TIMING CHAIN AND CYLINDER HEAD

(75) Inventors: Urs Wenger, Rumisberg (CH); Beat Rene Kohler, Kirchberg (CH); Hans-Rudolf Jenni, Grasswil (CH)

(73) Assignee: Swissauto Powersport LLC, Burgdorf (CH)

( * ) Notice: Subject to any disclaimer, the term of this patent is extended or adjusted under 35 U.S.C. 154(b) by 42 days.

(21) Appl. No.: 12/928,498

(22) Filed: Dec. 13, 2010

(65) Prior Publication Data

US 2011/0146614 A1  Jun. 23, 2011

Related U.S. Application Data

(66) Continuation of application No. PCT/US2010/049167, filed on Sep. 16, 2010, Substitute for application No. 61/358,308, filed on Jun. 24, 2010.

(30) Foreign Application Priority Data

Sep. 16, 2009 (EP) .................................... 09170400

(51) Int. Cl.
*F01M 1/00* (2006.01)

(52) U.S. Cl.
USPC .................................. 123/196 R; 123/90.33

(58) Field of Classification Search
USPC ................................ 123/90.33, 196 R, 196 M
See application file for complete search history.

(56) References Cited

U.S. PATENT DOCUMENTS

| | | |
|---|---|---|
| 3,523,592 A | 8/1970 | Fenton |
| 4,404,936 A | 9/1983 | Tatebe |
| 4,470,389 A | 9/1984 | Mitadera |
| 4,688,529 A | 8/1987 | Mitadera |
| 5,558,057 A | 9/1996 | Everts |
| 5,738,062 A | 4/1998 | Everts |
| 5,860,403 A | 1/1999 | Hirano |
| 5,947,075 A | 9/1999 | Ryu |
| 5,950,590 A | 9/1999 | Everts |
| 5,960,764 A | 10/1999 | Araki |
| 6,047,678 A | 4/2000 | Kurihara |
| 6,152,098 A | 11/2000 | Becker |
| 6,184,603 B1 | 2/2001 | Hamai |
| 6,213,079 B1 | 4/2001 | Watanabe |
| 6,213,081 B1 | 4/2001 | Ryu |
| 6,216,660 B1 | 4/2001 | Ryu |
| 6,227,160 B1 | 5/2001 | Kurihara |
| 6,394,061 B2 | 5/2002 | Ryu |

(Continued)

FOREIGN PATENT DOCUMENTS

| | | |
|---|---|---|
| DE | 44 47 138 A1 | 12/1997 |
| DE | 197 35 021 A1 | 2/1999 |

(Continued)

OTHER PUBLICATIONS

European Patent Office, International Search Report for PCT/US2010/049167, Jul. 6, 2011, 6 pages.

(Continued)

*Primary Examiner* — Noah Kamen
(74) *Attorney, Agent, or Firm* — Faegre Baker Daniels LLP

(57) ABSTRACT

A combustion engine is provided that includes at least one oil distribution mechanism for distributing lubrication oil to the engine.

22 Claims, 37 Drawing Sheets

(56) References Cited

U.S. PATENT DOCUMENTS

| | | |
|---|---|---|
| 6,397,795 B2 | 6/2002 | Hare |
| 6,510,829 B2 | 1/2003 | Ito |
| 6,520,133 B1 * | 2/2003 | Wenger et al. ............. 123/90.27 |
| 6,557,515 B2 | 5/2003 | Furuya |
| 6,561,315 B2 | 5/2003 | Furuya |
| 6,640,766 B2 | 11/2003 | Furuya |
| 6,769,391 B1 | 8/2004 | Lee |
| 6,786,187 B2 | 9/2004 | Nagai |
| 6,820,583 B2 | 11/2004 | Maier |
| 6,915,770 B2 | 7/2005 | Lu |
| 6,935,297 B2 | 8/2005 | Honda |
| 7,073,482 B2 | 7/2006 | Kirchberger |
| 7,100,562 B2 | 9/2006 | Terada |
| 7,104,242 B2 | 9/2006 | Nishi |
| 7,165,522 B2 | 1/2007 | Malek |
| 7,204,219 B2 | 4/2007 | Sakurai |
| 7,243,632 B2 | 7/2007 | Hu |
| 7,287,508 B2 | 10/2007 | Kurihara |
| 7,325,526 B2 | 2/2008 | Kawamoto |
| 7,395,804 B2 | 7/2008 | Takemoto |
| 2008/0022981 A1 | 1/2008 | Keyaki et al. |
| 2008/0083392 A1 | 4/2008 | Kurihara |
| 2008/0202483 A1 | 8/2008 | Procknow |
| 2009/0014246 A1 | 1/2009 | Lin |
| 2009/0064642 A1 | 3/2009 | Sato |
| 2010/0162989 A1 | 7/2010 | Aamand |
| 2011/0094225 A1 | 4/2011 | Kistner et al. |

FOREIGN PATENT DOCUMENTS

| | | |
|---|---|---|
| DE | 10 2005 003077 A1 | 8/2006 |
| DE | 10 2007 024126 A1 | 12/2008 |
| EP | 0 856 427 A1 | 8/1998 |
| JP | 60209616 | 10/1985 |
| JP | 2007278228 | 10/2007 |

OTHER PUBLICATIONS

European Patent Office, Written Opinion for PCT/US2010/049167, Jul. 6, 2011, 5 pages.

* cited by examiner

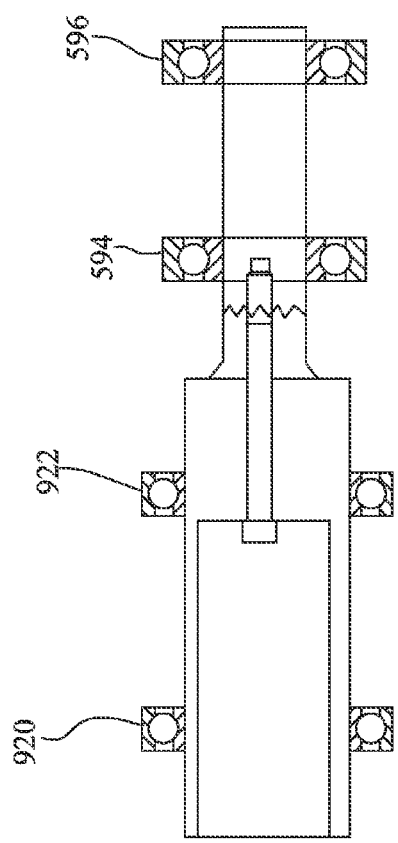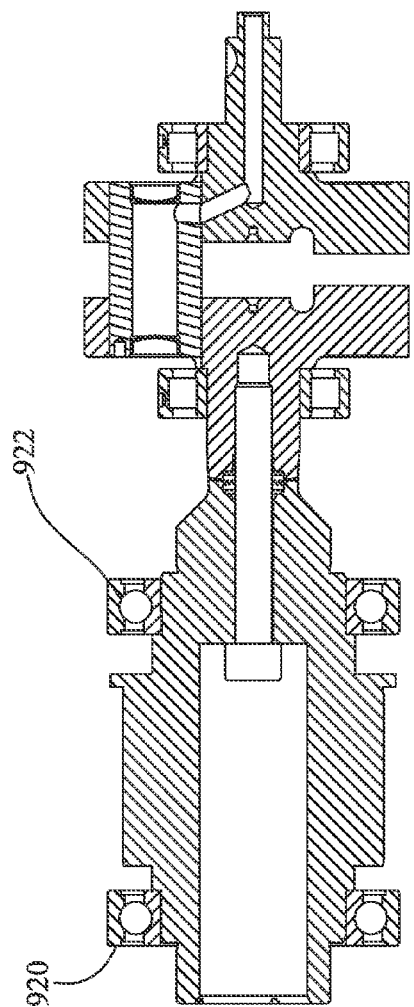

LUBRICATION ARRANGEMENT FOR TIMING CHAIN AND CYLINDER HEAD

This application is a continuation of PCT Application Serial No. PCT/US2010/049167.

FIELD OF THE INVENTION

The subject disclosure relates to electric vehicles and a charging system therefore, and in particular, an onboard engine generator for charging the battery packs. The vehicle has extended operating range with coupled combustion engine, whereby it concerns a serial hybrid electric vehicle according to the EC-Directives.

BACKGROUND AND SUMMARY

Electric vehicles are known having battery packs which drive an electric motor which in turn drives the vehicle wheels. Two types of vehicles are known using electric motors, the first is a hybrid electric vehicle where the vehicle includes an electric motor and an onboard fuel driven engine, where the engine is used to drive the wheels under certain vehicle circumstances.

Another type of electric vehicle also has an onboard fuel driven engine, but the engine is only used to drive a generator, which in turn charges the batteries. The latter type arrangement is referred to as range extender as the onboard engine/generator extends the range that the vehicle can travel on the battery pack before a complete recharge.

With this type of hybrid vehicle, also called electric vehicle with Range Extender, a combustion engine is coupled to an electric machine acting as a generator. The combustion engine delivers its power to the generator, which transforms the rotary motion into electric energy and supplies it to the battery to extend the range (travelling distance of a vehicle without external charge). Alternatively, the electrical energy could be connected to an electric traction motor of the vehicle. In this manner the combustion engine can be operated with a very good efficiency in all operating aspects, which has a positive effect on $CO_2$ emissions and fuel consumption of the aggregate. Multiple aspects of a range extender design and operation in a vehicle are addressed in this application.

A first factor of such aggregates is the coupling of the combustion engine to the generator, because the high combustion power of the engine causes substantial rotary imbalances and deformation on the crank shaft. In general, in order to couple a generator to a combustion engine, several solutions are known today, whereby the design of the generator plays an important role. The known solutions, e.g. according to DE 197 35 021 A1 or DE 10 2007 024 126 A1, concern applications in so-called parallel hybrid vehicles which have a complex coupling system in which the coupling parts are coupled axially.

Various solutions for the connection of the generator shaft with the crank shaft may be envisaged, for example an elastomer coupling could be provided, which however requires very much space axially as well as radially, and large tolerances must be chosen. These couplings also cannot absorb the required increasing dynamic torque.

Other connections include connection of the shafts through a cone or tapered coupling. The connections provide a rigid connection, but need space in length and diameter in order to have enough rigidity. Furthermore, axial tolerances are problematic because during the assembly, the mounting position dependent on the tightening torque cannot be exactly determined. Assembly and removal are also made more difficult.

Other connections include connection of the shafts through internal teeth. These connections however are complex to manufacture; the generated momentum provoke a mechanical play and running noise if a thrust tolerance is used; assembly and removal are problematic with crimp connections; and assembly length/space requirements are relatively high.

Based on this state of the art, it is an object of the invention to provide a serial hybrid electric vehicle in which the connection between the combustion engine and the generator is very precisely adjusted and has a torsion-resistant design, yet enabling both weight savings and easy assembly.

Another object is to enable an efficient length adjustment of the generator shaft and the crank shaft in case of variations in temperature.

Another object is to enable the generator to serve as the flywheel mass of the engine, reducing both the cost and the weight.

Another object is to provide minimum weight to the engine by eliminating such peripheral components as a tradition oil pump. Rather, a method of providing a "pump" from suction created during the compression stroke is shown herein.

Another object is to provide components within the engine requiring minimal lubrication.

Another object is to provide an engine design having a "run-ready" condition.

Another object is to provide an optimized heating/cooling system for the range extender and vehicle.

With the present design in accordance with the drawings, the generator is suitable for the mounting to different engines, whereby the coupling can in principle be made by any chosen connection of the shafts and the housing. Engine and generator are independent and are connected by a connecting member. For a single-cylinder engine with a very short crank shaft, this design is the most sensible solution because of the separate bearing of the generator rotor allows the air gap in the generator to be kept small in order to achieve a high efficiency. The bending moment in the crank shaft during combustion, as well as the bearing clearances on the short distance between the bearings can in an appropriate arrangement be carried by the generator bearing, thus preventing contact of the rotor and the housing.

Depending on the design and the stability of the shaft connection between the combustion engine and the generator, the generator may serve as a flywheel mass for the combustion engine, which is however not without difficulty because of the generated momentum, but is solved, with the solution at hand.

The present disclosure relates to an engine/generator and the control mechanism for a range extender engine.

In one embodiment, a serial hybrid electric vehicle is coupled with a combustion engine which serves to extend the operating range. The combustion engine is coupled to the generator of the range extender by a self-centering spur gearing.

In another embodiment of the invention, a serial hybrid electric vehicle is coupled with combustion engine which serves to extend the operating range. A crankshaft of the engine is fixedly connected to a shaft of the generator. A fixed bearing and a first floating bearing are located on the side of the generator and the bearings on the side of the engine are configured as floating bearings in order to absorb the length extensions of the shafts caused by temperature influence.

In another embodiment of the invention, a combustion engine, comprises a crankcase defining a journal area and an oil sump; a cylinder communicating with the crankcase; a cam chain chamber discrete from the crankcase; a crankshaft journalled in the journal area of the crankcase, with a first end extending into the cam chain chamber and a second end extending through the crankcase; a piston positioned in the cylinder; a connecting rod coupling the piston to the crankshaft; a head above the cylinder having at least one cam therein operating valves in the head; a first gear positioned on the crankshaft first end and positioned in the cam chain chamber; a second gear positioned on an end of the cam; a chain entrained around the first and second gear; a passageway defined between the oil sump and the crankshaft; wherein, when the piston is moving from a bottom dead center position to a top dead center position, a vacuum is created, siphoning oil through the passageway to lubricate at least a portion of the crankshaft.

In another embodiment of the invention, a combustion engine, comprises a crankcase defining a journal area and an oil sump; a cylinder communicating with the crankcase; a cam chain chamber discrete from the crankcase; a crankshaft journalled in the journal area of the crankcase, with a first end extending into the cam chain chamber and a second end extending through the crankcase; a piston positioned in the cylinder; a connecting rod coupling the piston to the crankshaft; a head above the cylinder having at least one cam therein operating valves in the head; a first gear positioned on the crankshaft first end and positioned in the cam chain chamber; a second gear positioned on an end of the cam; a chain entrained around the first and second gear; a port communicating between the crankcase and the cam chain chamber; and a valve allowing the flow of blow by gases and compressed gases into the cam chain chamber when the piston is moving from a top dead center position to a bottom dead center position.

In another embodiment of the invention, a combustion engine comprises a vehicle, comprising: an electric propulsion drive assembly; a first cooling circuit for the electric propulsion drive assembly; an engine, including a crankcase having an oil sump; and a pre-heater for the oil sump in fluid communication with the first cooling circuit for pre-heating engine oil.

In another embodiment of the invention, a combustion engine comprises a crankcase having an oil sump; and a pre-heater for pre-heating engine oil in the oil sump, the pre-heater being integrated with the oil sump of the crankcase.

In another embodiment of the invention, a combustion engine comprises a crankcase defining a journal area and an oil sump; a cylinder communicating with the crankcase; a cam chain chamber discrete from the crankcase; a crankshaft journalled in the journal area of the crankcase, with a first end extending into the cam chain chamber and a second end extending through the crankcase; a piston positioned in the cylinder; a head above the cylinder having at least one camshaft therein operating valves in the head; a first gear positioned on the crankshaft first end and positioned in the cam chain chamber; a second gear positioned on an end of the cam; a chain entrained around the first and second gear; and an oil distribution mechanism for distributing oil in the oil sump onto the cam chain for delivering lubrication oil to the head.

In another embodiment of the invention, a combustion engine comprises a crankcase defining a journal area and an oil sump; a cylinder communicating with the crankcase; a cam chain chamber discrete from the crankcase; a crankshaft journalled in the journal area of the crankcase, with a first end extending into the cam chain chamber and a second end extending through the crankcase; a piston positioned in the cylinder; a head above the cylinder having at least one camshaft therein operating valves in the head; a first gear positioned on the crankshaft first end and positioned in the cam chain chamber; a second gear positioned on an end of the cam; a chain entrained around the first and second gear; and an oil distribution mechanism or member for distributing oil in the oil sump onto the cam chain for delivering lubrication oil to the head.

In another embodiment of the invention, a control system is provided for an electric vehicle, where the electric vehicle includes a drive axle coupled to a chassis. The control system comprises an engine generator including an electrical machine driven by an engine, the engine generator being configured to generate electrical power; a controller configured to electronically control the engine of the engine generator; an electric motor configured to drive the drive axle of the electric vehicle; a battery configured to drive the electric motor and to receive the electrical power generated by the engine generator; and a mode selection device in communication with the controller for selecting one of a plurality of operating modes of the engine generator, the plurality of operating modes providing variable rates of electrical power generation.

An inventive method of controlling an engine of an electric vehicle including a generator driven by the engine and an electric motor driven by an onboard battery, the method includes the steps of: monitoring a vehicle speed of the electric vehicle; starting the engine of the electric vehicle when the vehicle speed increases to a first predetermined threshold; generating electrical power with the generator for use by the electric vehicle; and stopping the engine of the electric vehicle when the vehicle speed decreases to a second predetermined threshold.

An inventive method of controlling an engine of an electric vehicle including a generator driven by the engine and an electric motor driven by an onboard battery, the method includes the steps of: providing a vehicle control unit for controlling an electrical system of the electric vehicle, the electrical system including the electric motor and the battery; driving the electric motor with the battery; monitoring a plurality of parameters of the battery with the vehicle control unit, the plurality of parameters including at least one of a voltage level, a charge level, and a temperature level; starting the engine of the electric vehicle when each of the plurality of parameters of the battery are below a predetermined minimum threshold; generating electrical power with the generator for use by the electric vehicle; and charging the battery of the electric vehicle with the generated electrical power.

An inventive method of charging a battery of an electric vehicle, the electric vehicle including a generator driven by an engine and an electric motor driven by the battery, the electric motor being configured to drive a drive axle of the electric vehicle to move the electric vehicle. The method includes the steps of providing a regenerative braking system with the electric vehicle, the regenerative braking system being configured to transfer kinetic energy of the electric vehicle to the electric motor to rotate the electric motor in a reverse direction; rotating the electric motor in a forward direction with electrical power from the battery to move the electric vehicle; generating a first electrical current with the generator, the first electrical current being routed to the battery; rotating the electric motor in a reverse direction with the regenerative braking system to slow movement of the electric vehicle and to generate a second electrical current, the second electrical current being routed to the battery; charging the battery with the first and second electrical currents; monitoring the first and second electrical currents during the charging step to determine a total electrical current supplied to the battery; and removing the first electrical current from the battery upon the total electrical current exceeding a first predetermined threshold.

In another embodiment, an electric vehicle, comprises a chassis; a drive axle coupled to the chassis; an electric motor configured to drive the drive axle; a battery configured to drive the electric motor; an engine generator configured to generate electrical power and to provide electrical power generated to the battery; and a mass supported by the engine to dampen vibrations of the engine.

Finally, a method of controlling an engine of an electric vehicle, where the electric vehicle includes a generator driven by the engine, an electric motor driven by a battery, and a transmission having a plurality of gears, the method including the steps of: monitoring a vehicle speed of the electric vehicle; placing the transmission of the electric vehicle in a neutral gear; receiving a user input configured to activate the engine of the electric vehicle; starting the engine of the electric vehicle upon receipt of the user input and upon the vehicle speed of the electric vehicle being at or below a predetermined threshold value; generating electrical energy with the generator; routing the electrical energy to the battery; and charging the battery of the electric vehicle with the generated electrical energy.

The invention will now be explained in more detail in the following by means of drawings of an exemplary embodiment, where:

BRIEF DESCRIPTION OF THE DRAWINGS

FIGS. 35A and 35B show the bearings on the shafts;

DETAILED DESCRIPTION OF THE EMBODIMENTS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
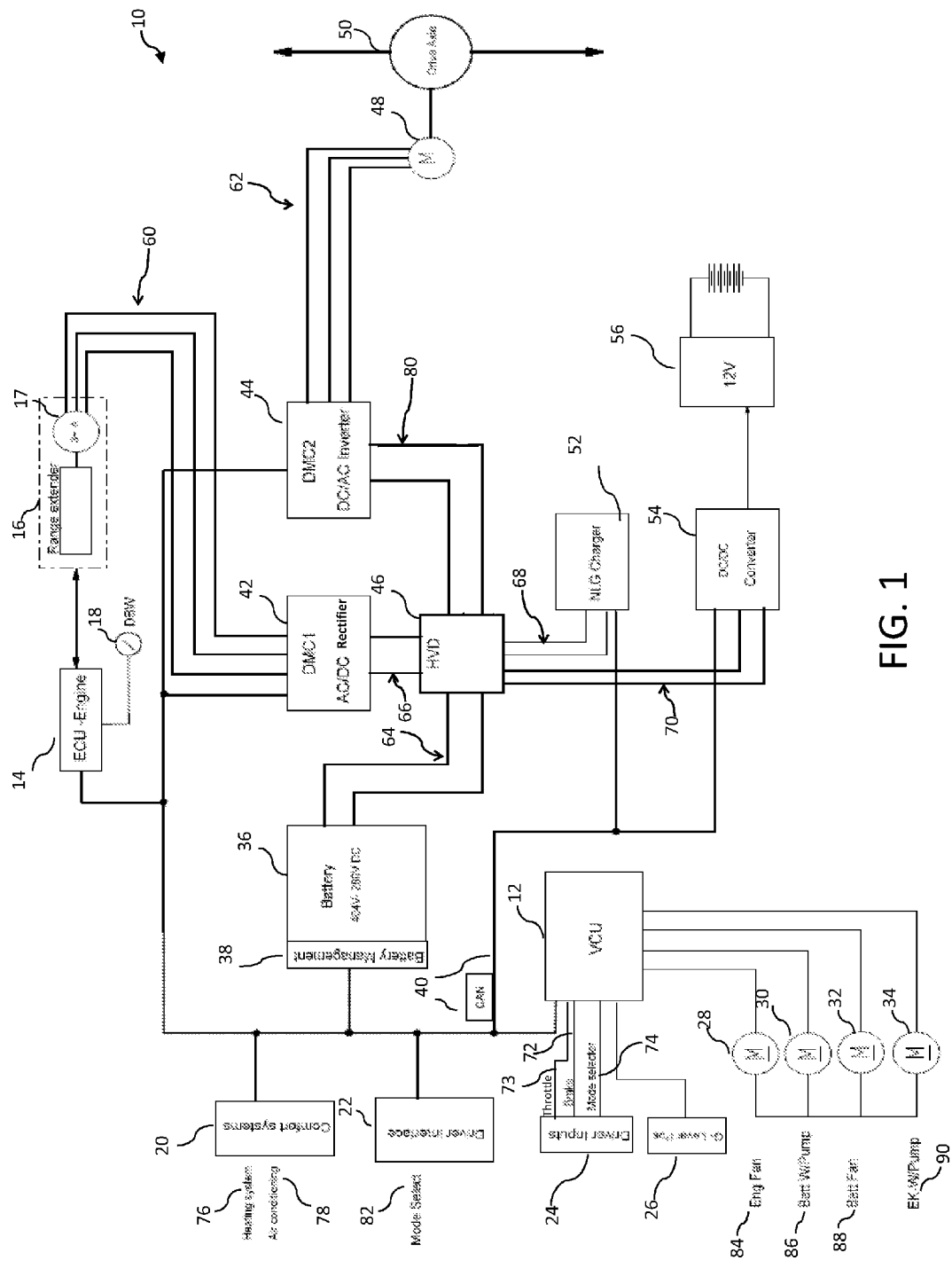
FIG. 1 illustrates a representative view of an exemplary electrical system of an electric vehicle according to one embodiment.

Referring initially to FIG. 1, an electrical system 10 is shown for controlling the operation of an electric vehicle. The electric vehicle may be a car, an all-terrain vehicle, a sport utility vehicle, a watercraft, or any other suitable vehicle. In the illustrated embodiment, electrical system 10 is configured for use with a car. Electrical system 10 includes a vehicle battery 36 that provides electrical power to a vehicle motor 48 for driving a drive axle 50 of the electric vehicle. A range extender 16 serves to generate electrical power for utilization in electrical system 10, such as for charging vehicle battery 36 or for powering vehicle motor 48 of the electric vehicle. Electrical system 10 includes a vehicle control unit (VCU) 12 in communication with an electronic control unit (ECU) 14. In the illustrated embodiment, ECU 14 is an electronic controller configured to control the operation of an engine of range extender 16. ECU 14 illustratively provides control signals to the engine of range extender 16 via a drive-by-wire system 18. ECU 14 may control, for example, the throttle position; the engine speed, the ignition timing, and other parameters of the engine of range extender 16. Range extender 16 includes an electrical generator 17 coupled to and driven by the engine. See, for example, range extender 16 having generator 17 and an engine as illustrated in FIGS. 7-31 and described herein.

VCU 12 is an electronic controller configured to control the electrical systems and subsystems of the electric vehicle. For example, VCU 12 may control fan and water pump motors, control and monitor vehicle speed and vehicle motor speed, receive and execute driver inputs and commands, and control the heating and cooling system of the electric vehicle. In one embodiment, VCU 12 includes a microprocessor having software that contains instructions for controlling the startup and operation mode of range extender 16. In the illustrated embodiment, VCU 12 is configured to apply switched voltage to ECU 14 according to the control logic illustrated in FIG. 2 to start range extender 16. In one embodiment, ECU 14 controls the engine of range extender 16 using vehicle parameters provided by VCU 12. Alternatively, ECU 14 may include a microprocessor having software for executing the control logic of FIG. 2 and for controlling range extender 16.

A communication network 40 is provided for communication between VCU 12 and various components and devices of electrical system 10. Communication network 40 illustratively uses controller area network (CAN-bus) protocol, although other suitable communication protocols between components of electrical system 10 may be used. In the illustrated embodiment, VCU 12 communicates with ECU 14, a comfort system 20, a driver interface 22, a vehicle battery 36, a rectifier 42, an inverter 44, a charger 52, and a converter 54 over a communication network 40.

Comfort system 20 illustratively includes a heating system 76 and an air conditioning system 78. In the illustrated embodiment, VCU 12 controls the operation of heating system 76 and air conditioning system 78. Driver interface 22 may include user inputs that allow a user to adjust the settings of the comfort system 20 of the electric vehicle.

Electrical system 10 further includes driver inputs 24 and a gear selector 26. Driver inputs 24 illustratively include a brake input 72, a throttle input 73, and a mode selector 74. Brake input 72 provides a signal to VCU 12 that causes VCU 12 to slow or stop movement of the electric vehicle by applying brakes to the wheels, for example, of the electric vehicle. In the illustrated embodiment, the electric vehicle includes a regenerative braking system that works in tandem with a mechanical brake. In particular, the mechanical brake is configured to assist with braking when the regenerative brake is unable to apply adequate braking force to meet the brake input demand. Throttle input 73 provides a signal to VCU 12 representative of the position of a throttle input device, such as a pedal, lever, or twist-grip device. In response, VCU 12 controls the speed and torque of vehicle motor 48 based on the signal provided with throttle input 73.

Mode selector 74 provides a signal to VCU 12 representative of a selected operating mode of the electric vehicle. Exemplary operating modes include an economic mode and a sport mode. In an economic mode, the driving performance of the vehicle is limited such that the life and performance of the vehicle is maximized. For example, rapid acceleration of the vehicle may be limited in an economic mode. A sport mode provides maximum wheel performance (e.g. rapid acceleration and power) while expending the energy of vehicle battery 36 at a potentially faster rate than in the economic mode.

Gear selector 26 provides a signal to VCU 12 representative of a selected gear of operation of the electric vehicle. In the illustrated embodiment, gear selector 26 includes a forward gear, a reverse gear, and neutral. Gear selector 26 and mode selector 74 may be in the form of a switch, a button, a lever, or other suitable device configured to receive a user input for selecting the mode or gear of operation of the vehicle.

Figure 4:
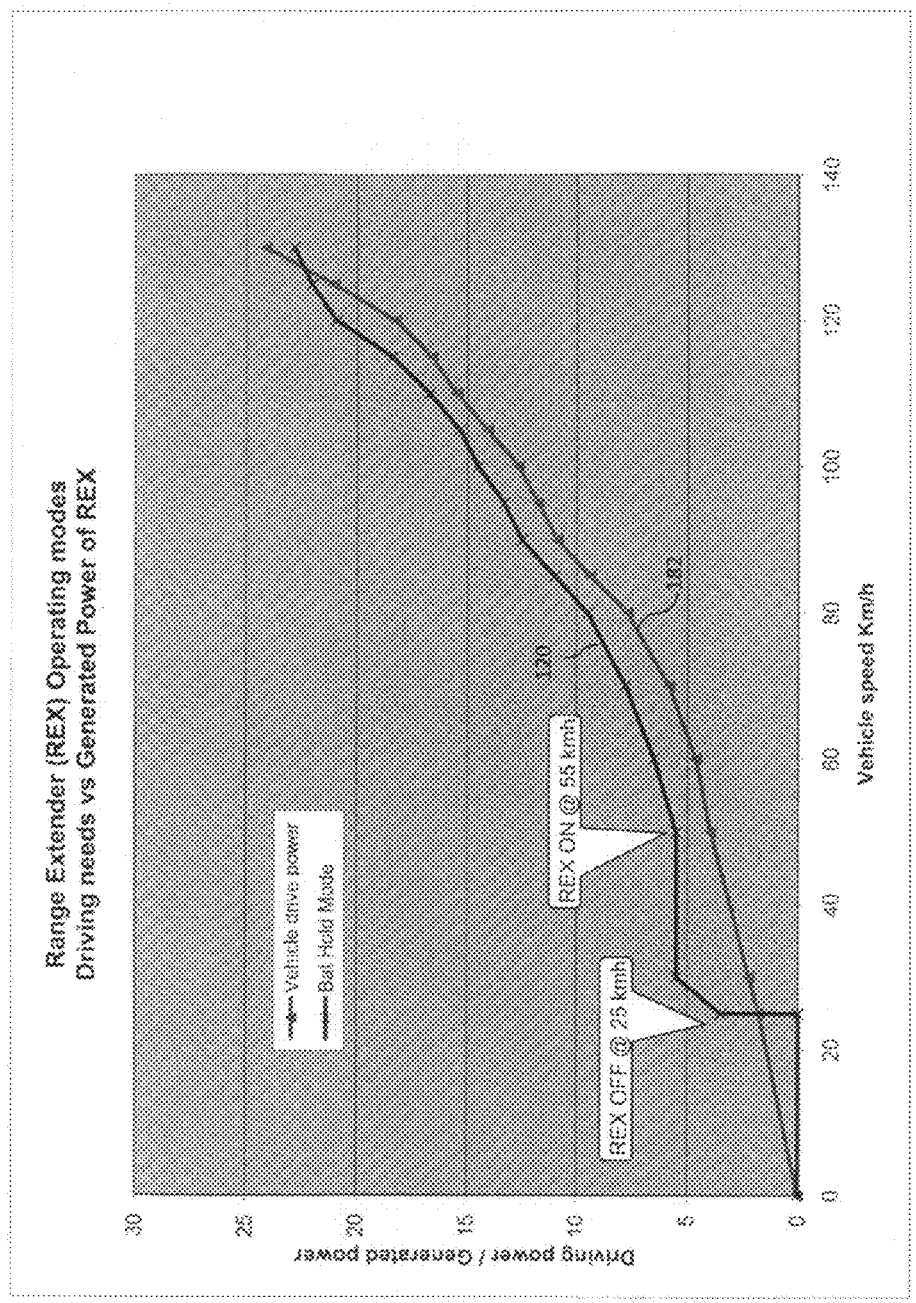
FIG. 4 is a graph illustrating exemplary vehicle drive power consumption and an exemplary battery hold mode of the range extender of FIG. 1.
Figure 5:
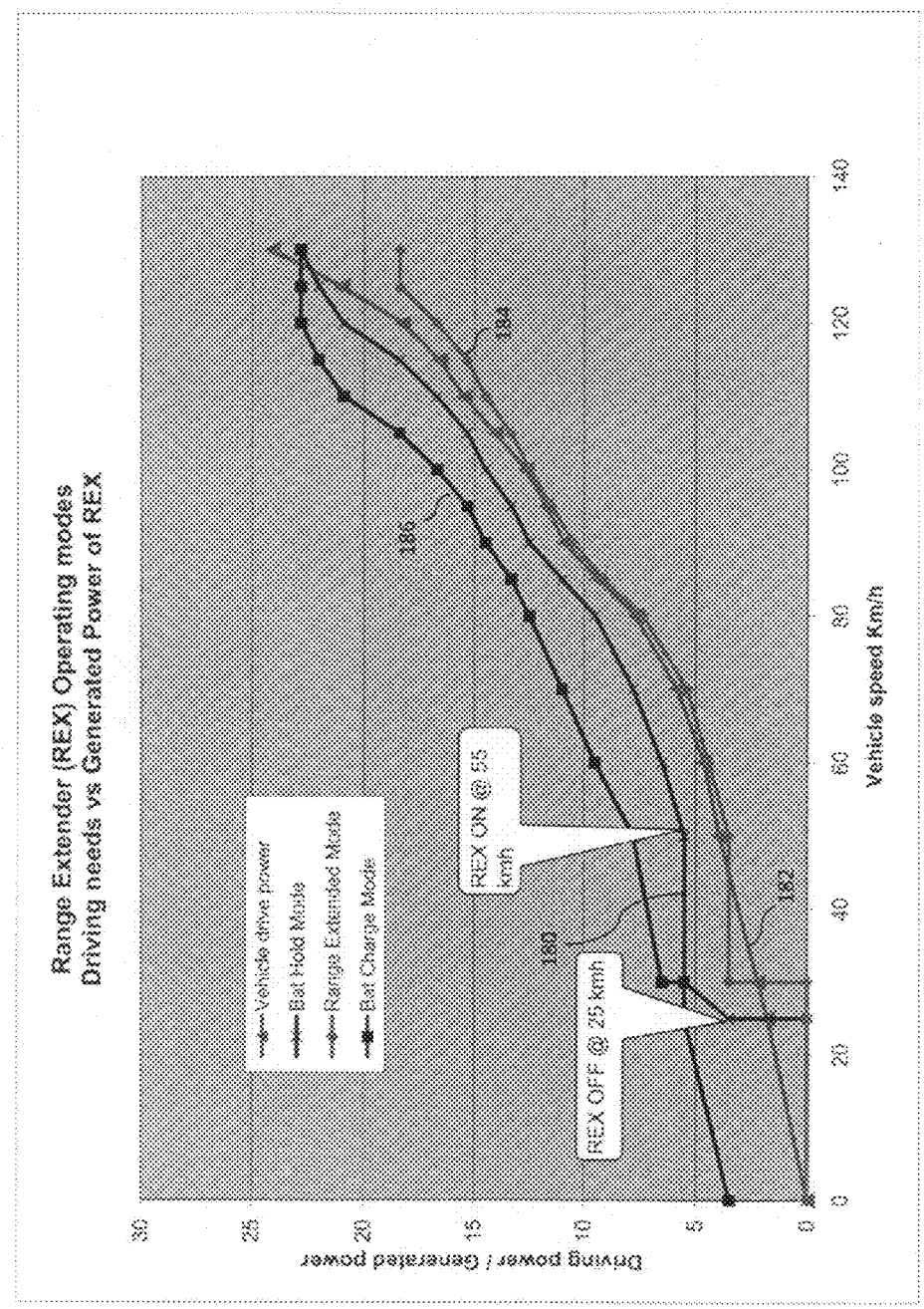
FIG. 5 is a graph illustrating an exemplary range extended mode and an exemplary battery charge mode of the range extender of FIG. 1.

Driver interface 22 includes a mode select input 82 that provides a signal to VCU 12 representative of a selected operating mode of range extender 16. Mode select input 82 is also configured to start and stop range extender 16. Exemplary operating modes of range extender 16 include a battery hold mode, a range extended mode, and a battery charge mode, as illustrated in FIGS. 4-5 and described herein. In a battery hold mode, range extender 16 operates to maintain the charge of vehicle battery 36 at a substantially constant level. In particular, range extender 16 generates approximately the same or more electrical energy than the electric vehicle on average consumes during operation of the vehicle. In a battery charge mode, range extender 16 operates to increase the charge of vehicle battery 36. In particular, range extender 16 generates substantially more electrical energy than is drawn from vehicle battery 36 on average during operation of the vehicle. In a range extended mode, range extender 16 operates to extend the range or "life" of vehicle battery 36. In particular, range extender 16 generates less electrical energy than is drawn from vehicle battery 36 on average during operation of the vehicle. In one embodiment, driver inputs 24, gear selector 26, and mode select input 82 are all provided at driver interface 22.

In the illustrated embodiment, VCU 12 controls the operation of fan motors 28 and 32 and water pump motors 30 and 34. Fan motors 28 and 32 may be single phase or three phase motors. Fan motor 28 illustratively drives an engine fan 84 for cooling the engine of range extender 16 when the engine reaches high temperature levels. Fan motor 32 and water pump motor 30 illustratively drive a battery fan 88 and battery water pump 86, respectively, for cooling vehicle battery 36 and related battery circuitry of electrical system 10. Water pump motor 34 illustratively drives a water pump 90 for cooling the electrical components and circuitry of electrical system 10, including rectifier 42, inverter 44, ECU 14, VCU 12, generator 17, converter 54, and vehicle motor 48. In one embodiment, the electrical circuit of electrical system 10 is maintained at a temperature of about 60 degrees or less. In the illustrated embodiment, water pump motor 34 is further used to preheat the oil of the engine of range extender 16.

Vehicle battery 36 is configured to provide power to vehicle motor 48 for driving the electric vehicle. Vehicle battery 36 is illustratively a 404V-280V DC battery, although other suitable voltage capacities for vehicle battery 36 may be used depending on vehicle requirements. Vehicle battery 36 is coupled to vehicle motor 48 via a voltage distributor 46. Voltage distributor 46 is illustratively a high voltage distribution box configured to route voltage received from vehicle battery 36 and from range extender 16 to appropriate devices in electrical system 10. In the illustrated embodiment, voltage distributor 46 is coupled to vehicle battery 36 via wires 64, to rectifier 42 via wires 66, to inverter 44 via wires 80, to charger 52 via wires 68, and to DC/DC converter 54 via wires 70. Wires 64, 66, 68, 70, and 80 illustratively include hot and ground wire pairs capable of transferring high voltage between the respective components.

Voltage distributor 46 routes the electrical power received from vehicle battery 36 to DC/AC inverter 44. Inverter 44 converts the DC voltage from voltage distributor 46 to AC voltage and provides the AC voltage to vehicle motor 48 via motor cables 62. In the illustrated embodiment, vehicle motor 48 is a three-phase AC motor. In one embodiment, a regenerative braking system is utilized to generate electrical energy from the kinetic energy of the vehicle during vehicle braking. In particular, the kinetic energy of the vehicle is used to drive vehicle motor 48 in the opposite direction, thereby causing vehicle motor 48 to generate electrical energy that is fed back through voltage distributor 46. The generated electrical energy may then be stored in vehicle battery 36 or used to preheat a catalytic converter of range extender 16, for example. Alternatively, a separate motor may be used for the regenerative braking.

Generator 17 provides electrical power to AC/DC rectifier 42 via cables 60. In the illustrated embodiment, generator 17 is a three-phase motor that is operated in reverse to function as an electricity generator. In particular, the engine of range extender 16 drives generator 17 and causes generator 17 to produce AC power provided to rectifier 42. Rectifier 42 converts the AC voltage received from electrical generator 17 to DC voltage. Voltage distributor 46 routes the generated DC voltage received from rectifier 42 to the appropriate destination in electrical system 10, such as to charge battery 36 or to drive vehicle motor 48 directly. In one embodiment, generator 17 also serves as a starter for the engine of range extender 16. In particular, vehicle battery 36 may provide a voltage to the motor of generator 17 via cables 60, causing the motor of generator 17 to rotate in the forward direction to start the engine of range extender 16. As such, an additional starter motor and alternator is not required, thereby reducing the size and weight of range extender 16.

Vehicle battery 36 illustratively includes a battery manager 38 that manages various parameters of vehicle battery 36. In one embodiment, battery manager 38 includes a computer with software that contains limits for the discharge rate, the charge rate, the maximum and minimum voltage, and the maximum and minimum temperature of battery 36. In particular, battery manager 38 may monitor the level of charge in vehicle battery 36 and initiate a control event detected by VCU 12 when the charge of vehicle battery 36 reaches a predetermined level. For example, when the stored charge of vehicle battery 36 reaches a predetermined low level, battery manager 38 may provide VCU 12 with a "low voltage" warning. In response, VCU 12 may instruct ECU 14 to start the range extender 16 to generate more electrical energy that is fed back into electrical system 10 for charging vehicle battery 36. Similarly, when the stored charge of vehicle battery 36 reaches a predetermined high, level, battery manager 38 may provide VCU 12 with a "high voltage" warning. In response, VCU 12 may instruct ECU 14 to stop or reduce the generation of electrical energy by generator 17. In the illustrated embodiment, battery manager 38 is configured to communicate with various devices, including VCU 12, on communication network 40 to assist with the management of battery 36.

Charger 52 is configured to couple to an external power source for charging battery 36. In one embodiment, charger 52 is a plug-in charger that connects to and draws electrical power from an electrical outlet to charge battery 36. DC/DC converter 54 converts DC voltage from battery 36 to a lower voltage level to provide a battery source 56. Battery source 56, illustratively 12 volts, may be utilized by low-voltage devices of the electric vehicle, such as lights and the instrument panel.

Figure 2:
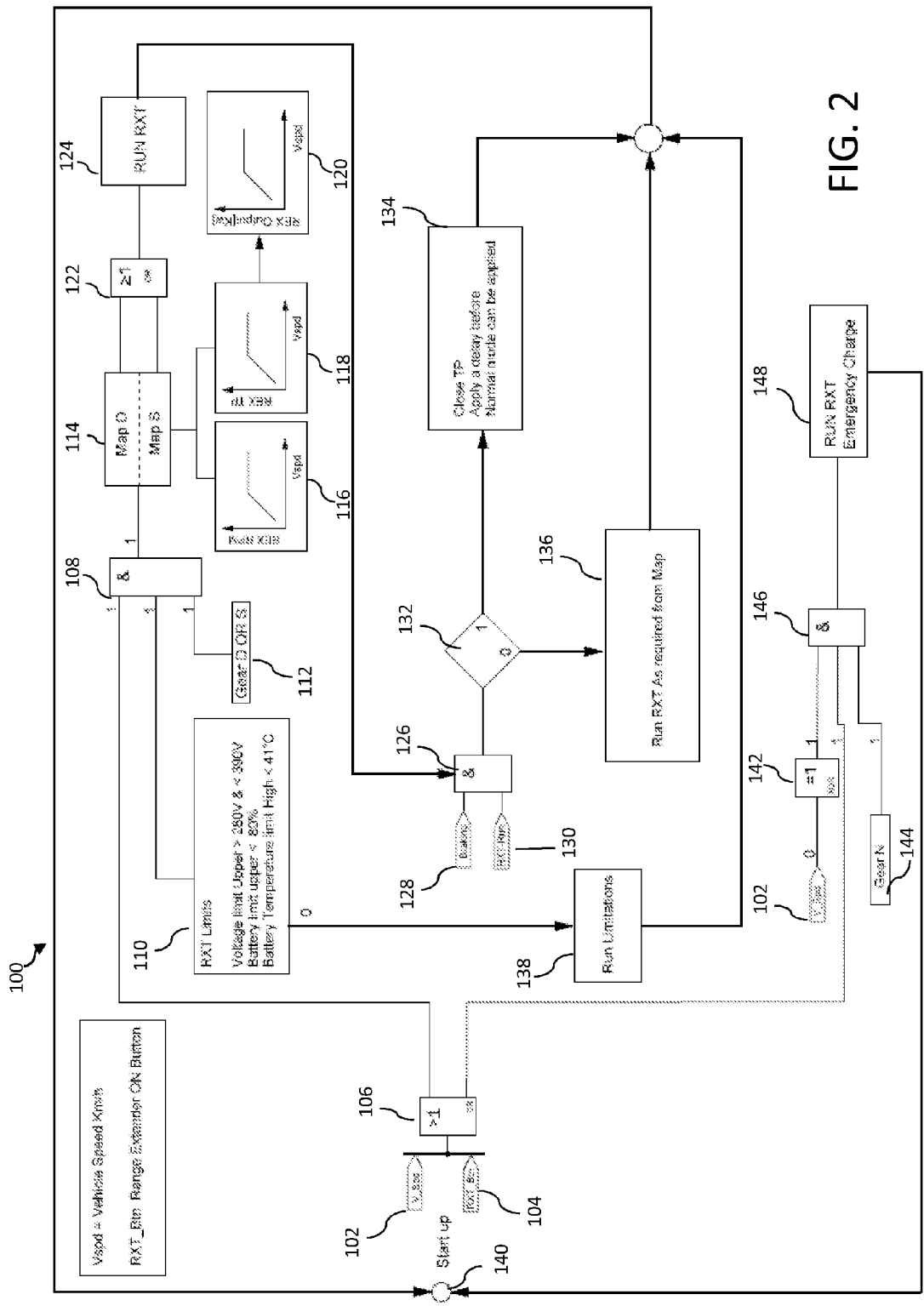
FIG. 2 illustrates exemplary control logic for controlling the range extender of the electrical system of FIG. 1.

Referring to FIG. 2, exemplary control logic 100 is shown for controlling the operation of range extender 16. In the illustrated embodiment, control logic 100 is contained within a memory of VCU 12, although ECU 14 may alternatively contain at least a portion of control logic 100.

Block 106 is true if a vehicle speed flag 102 is set or if a range extender ON flag 104 is set. In one embodiment, a button or switch located at driver interface 22 or instrument panel may be used to set range extender ON flag 104 to initiate control logic 100 of FIG. 2. In one embodiment, the selection of an operating mode of range extender 16 with mode select input 82 (see FIG. 1) sets range extender ON flag 104. As such, a user may activate range extender 16 manually under certain conditions. Vehicle speed flag 102 is set when the electric vehicle is at or above a predetermined minimum vehicle speed. In the illustrated embodiment, the minimum vehicle speed required to set vehicle speed flag 102 is about 55 kilometers/hour, although other suitable minimum vehicle speeds may be selected. If the vehicle speed 102 drops below a predetermined minimum level, range extender 16 is switched OFF automatically, as described herein. In the illustrated embodiment, range extender 16 is deactivated (i.e. block 106 goes from true to false) when the vehicle speed 102 drops below about 25 kilometers/hour, although other suitable minimum vehicle speeds may be selected. With range extender 16 only operating automatically at higher vehicle speeds, the road noise or other noise from the electric vehicle serves to drown out the noise generated by range extender 16.

The operating limits illustrated in block 110 are used to start or stop range extender 16 automatically depending on several parameters of vehicle battery 36. The limits illustrated in block 110 are exemplary, and other suitable limits may be provided at block 110 depending on vehicle configurations. In the illustrated embodiment, range extender 16 is configured to be activated (i.e. block 110 is "true") if the voltage of vehicle battery 36 drops to 280 volts or less, the charge percentage of vehicle battery 36 is less than 80% of full capacity, and the temperature of vehicle battery 36 is less than about 41 degrees Celsius. At block 110, if the voltage of vehicle battery 36 rises to 390 volts, if the charge percentage of vehicle battery 36 meets or exceeds 80% of full capacity, or if the temperature of vehicle battery 36 meets or exceeds about 41 degrees Celsius, the control logic proceeds to block 138. At block 138, action is taken by VCU 12 to respond to the exceed limitations. Depending on the cause of the exceeded limits, VCU 12 may deactivate generator 17 of range extender 16 and/or deactivate charger 52 to reduce the likelihood of overloading vehicle battery 36.

Block 112 requires the selection of a mode of operation of the vehicle, such as the "sport" or "economic" modes described above. If blocks 106, 110, and 112 are all true, the control logic proceeds to block 114. In the illustrated embodiment, range extender 16 is configured to generate a certain load (based on engine speed or rpm) depending on the vehicle speed and the selected mode of operation of range extender 16. At blocks 114 and 122, VCU 12 (or ECU 14) identifies the selected mode of operation for range extender 16. The mode of operation is illustratively selected with mode select input 82 of FIG. 1. In the illustrated embodiment, battery hold mode, battery charge mode, or range extended mode may be identified at blocks 114 and 122. Once the mode of operation is identified, the run flag 130 is set at block 124.

Upon identifying the appropriate mode of operation for range extender 16 and setting run flag 130, the control logic proceeds to block 126. At blocks 126, 132, and 136, the selected mode of operation for range extender 16 is implemented by VCU 12 and/or ECU 14. As long as block 126 is false, range extender 16 is run according to the selected mode of operation, as represented by block 136. As such, a startup event 140 is generated and range extender 16 is activated and run according to the selected mode of operation.

With the vehicle and range extender 16 running, the vehicle brake may be applied which causes the regenerative braking to be initiated. In such a case, both range extender 16 and the regenerative braking system generates electrical power that is fed back to vehicle battery 36. In order to avoid a current overload of vehicle battery 36, a flag 128 is set when the generated current supplied to vehicle battery 36 exceeds an upper threshold. For example, if the upper current threshold of vehicle battery 36 is 80 amps, flag 128 is set when the combined current generated by range extender 16 and the regenerative braking system meets or exceeds 80 amps. In this situation, range extender 16 is deactivated at block 134 by closing the throttle plate of the engine of range extender 16, thereby by stopping the generation of electrical power by generator 17. In one embodiment, if the upper current threshold limit is still exceeded after stopping generator 17, the regenerative braking system is disabled or the generated current from the regenerative braking system is redirected in order to avoid overloading vehicle battery 36. In one embodiment, flag 128 is set when the limits illustrated in block 110 are exceeded. At block 134, a time delay may be implemented before a startup event 140 may be generated and range extender 16 may be re-activated.

In one embodiment, the mode of operation may be changed on the fly during the operation of the electric vehicle and range extender 16. For example, a user may select a new mode of operation with mode select input 82 (see FIG. 1) while range extender 16 is running in a different mode of operation.

If block 106 is true, the control logic also proceeds to block 146: As represented by blocks 142, 144, and 146, if the vehicle speed 102 is at or about zero and the vehicle is in a neutral gear, range extender 16 may be run to charge vehicle battery 36. In particular, the user must manually select a button or other input device at the driver interface to set the range extender ON flag 104 and to activate range extender 16 at block 148. The manual activation of range extender 16 at block 148 may be used, for example, when the vehicle is stopped and vehicle battery 36 is dropping to a low charge level, such as in a traffic jam.

Figure 3:
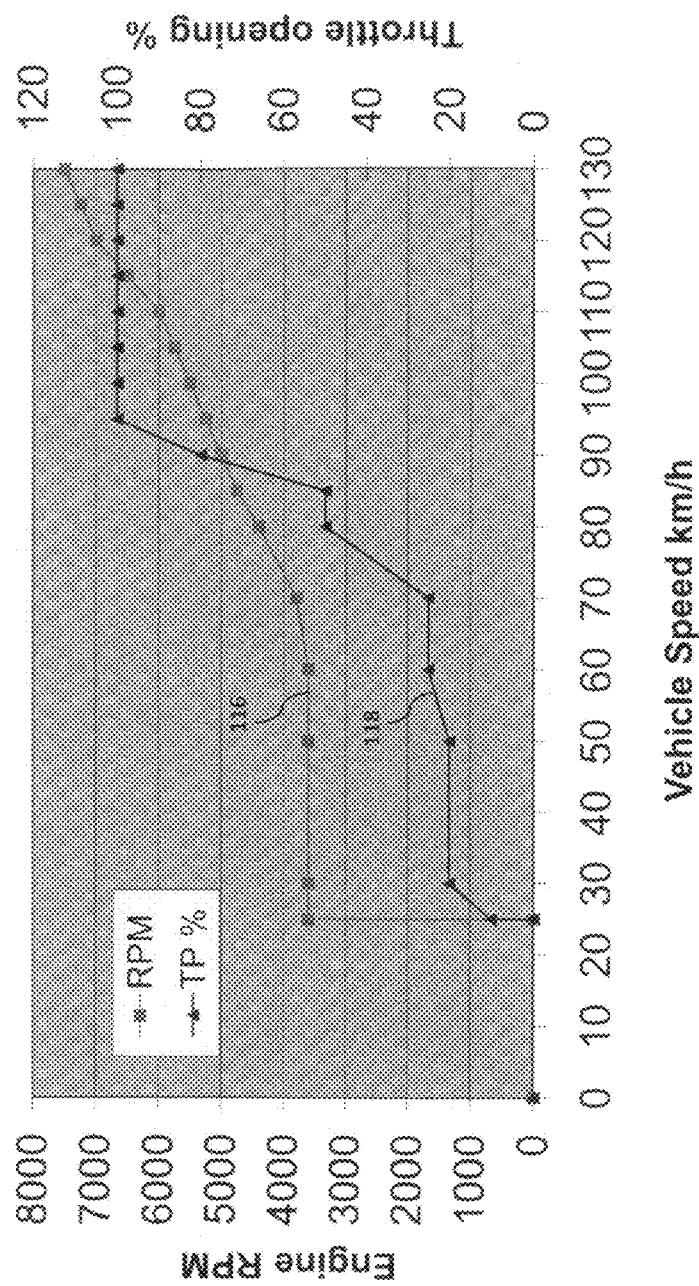
FIG. 3 is a graph illustrating vehicle speed versus engine speed and throttle opening percentage in an exemplary battery hold mode of the range extender of FIG. 1.

In the illustrated embodiment, range extender 16 is configured to generate a certain load depending on the vehicle speed and the selected mode of operation of range extender 16. In each mode of operation, the engine speed of range extender 16 varies depending on vehicle speed. FIG. 3 illustrates the engine speed and the throttle opening of range extender 16 in an exemplary battery hold mode of operation for range extender 16. In the battery hold mode, the engine speed (RPM) of range extender 16 follows curve 116 and the throttle opening percentage of range extender 16 follows curve 118 in relation to the vehicle speed. The load generated by range extender 16 depends on the engine speed of range extender 16. In the exemplary battery hold mode of operation, range extender 16 generates a power curve 120 (see FIGS. 4 and 5) for the illustrated vehicle speed range.

Power curve 182 of FIGS. 4 and 5 illustrates the exemplary average electrical power needed by vehicle motor 48 to drive the vehicle on a substantially flat road or surface. As illustrated in FIG. 4, the electrical power generated by range extender 16 in the battery hold mode is greater than or equal to the electrical power consumed on average by vehicle motor 48 when the vehicle is driving on a flat road for the illustrated range of speeds. As such, battery hold mode may be utilized when the vehicle traverses both hilly and flat terrain. In the battery hold mode illustrated in FIG. 4, range extender 16 creates supplemental electrical energy between vehicle speeds of about 25 kilometers/hour and 80 kilometers/hour.

Exemplary power curves for the battery charge mode and range extended mode of operation are illustrated in FIG. 5. In a range extended mode, range extender 16 generates a power curve 184 for the illustrated vehicle speed range. As illustrated, the power generated by range extender 16 in the range extended mode is less than or equal to the power consumed on average by vehicle motor 48 when the vehicle is driving on a flat surface. In the illustrated embodiment, range extended mode is configured to extend the range or "life" of vehicle battery 36 and not necessarily maintain the charge of vehicle battery 36.

In a battery charge mode, range extender 16 generates a power curve 186 for the illustrated vehicle speed range. As illustrated, the power generated by range extender 16 in the battery charge mode is substantially more than the power consumed on average by vehicle motor 48 when the vehicle is driving on a flat surface. As such, the battery charge mode is used to charge vehicle battery 36 during operation of the vehicle.

For the battery hold and range extended modes of operation illustrated in FIG. 5, energy generation by range extender 16 is activated when the vehicle speed reaches about 55 kilometers/hour and is deactivated when the vehicle speed drops below about 25 kilometers/hour. In the battery charge mode illustrated in FIG. 5, range extender 16 is configured to generate electrical energy for all vehicle speeds, including vehicle speeds between 0 and 55 kilometers/hour.

Figure 6:
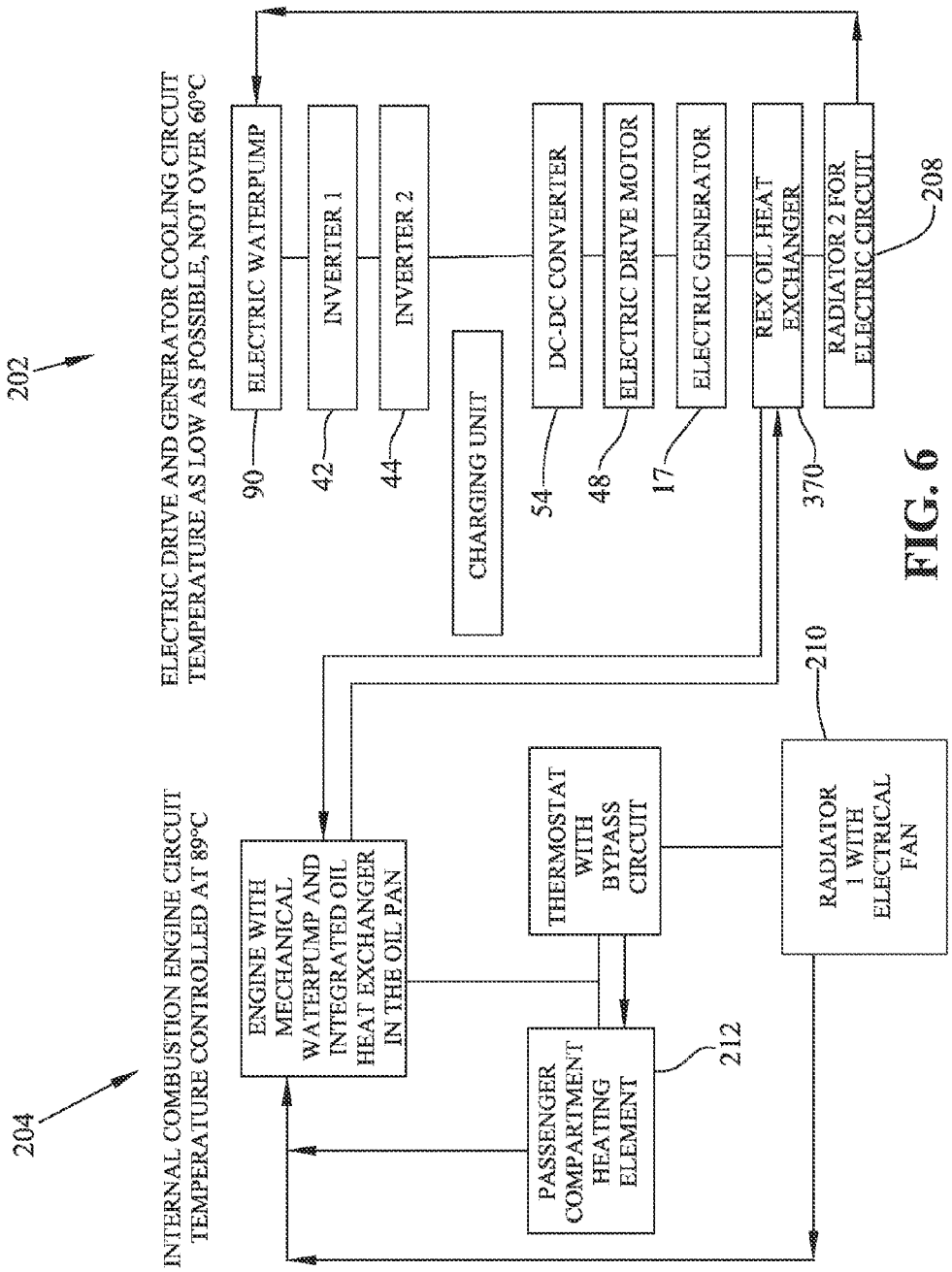
FIG. 6 is schematic view of the vehicle system cooling system.

With reference now to FIG. 6, the vehicle has a cooling system shown generally at 200 having a low temperature circuit 202 and a high temperature circuit at 204. Low temperature circuit 202 is comprised of an electrical water pump 206 and a radiator at 208 where water pump 206 circulates low temperature cooling water through rectifier 42, inverter 44, DC to DC converter 54, electrical drive motor 48 and generator 17. This cooling water also runs through an oil pre-heater located within the range extender engine as described herein.

A separate, and higher temperature circuit 204 is provided which circulates cooling water through the engine water jackets of the engine in a typical fashion. A second radiator 210 is provided for cooling the engine cooling water and a heating element 212 provides heating for the passenger compartment. The vehicle can also have an onboard electric heater (not shown) and the system can determine whether it is more efficient to run the range extender engine to provide the passenger compartment heating or to heat the engine by way of the electrical heater and recharge the batteries with the range extender.

Figure 7:
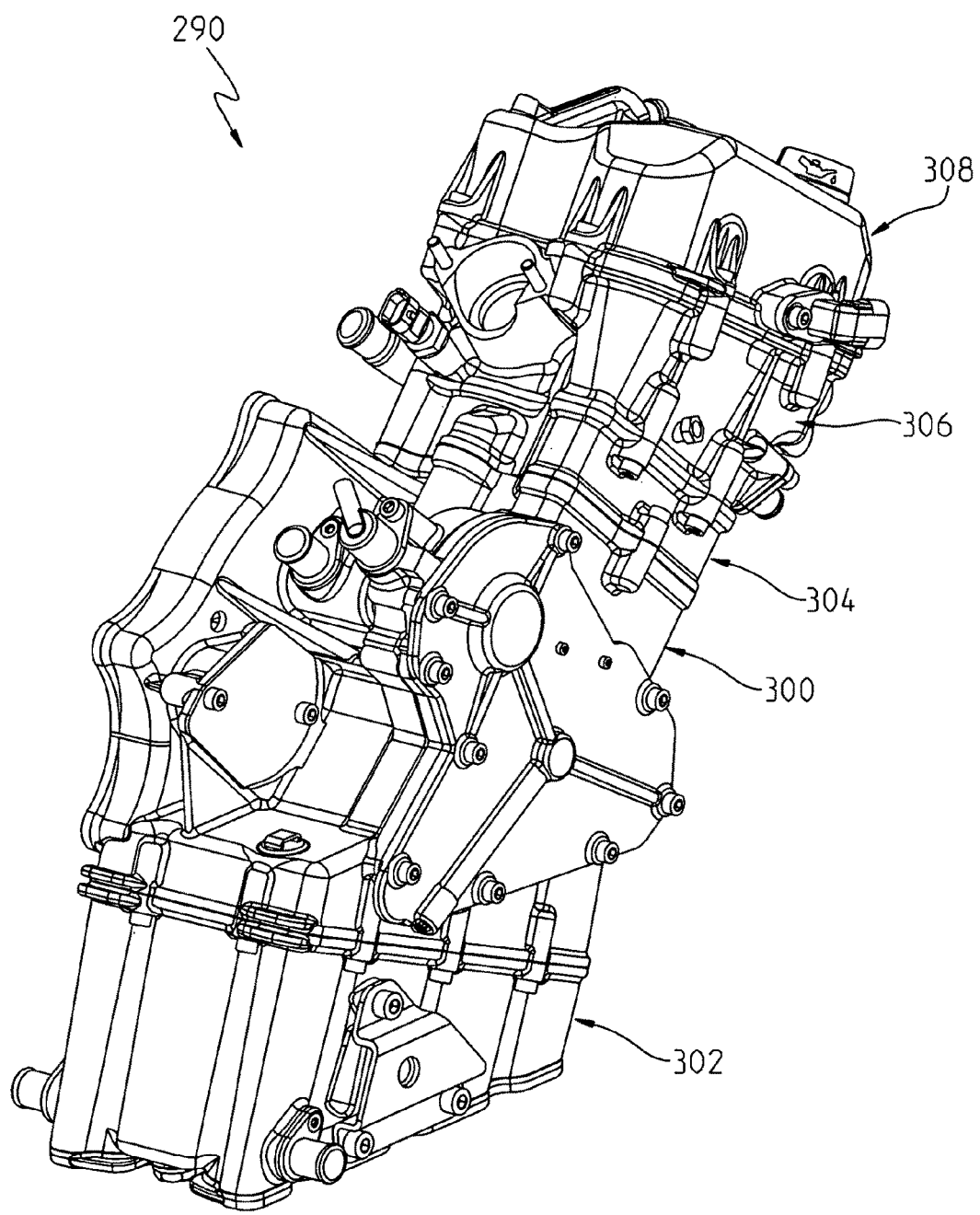
FIG. 7 shows a perspective view of the engine of the present embodiment.
Figure 8:
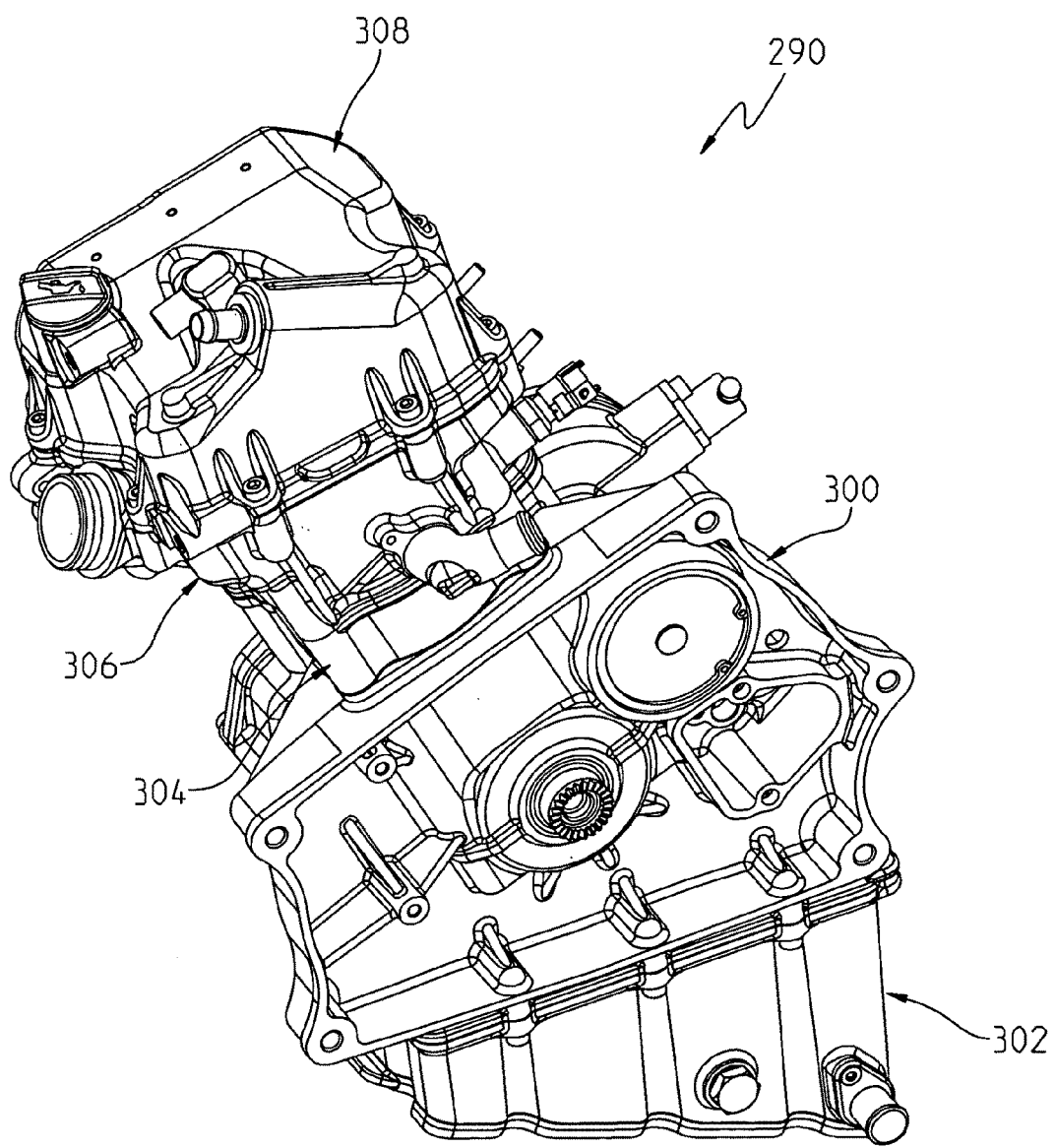
FIG. 8 shows a perspective view of the opposite side of the engine shown in FIG. 7.
Figure 9:
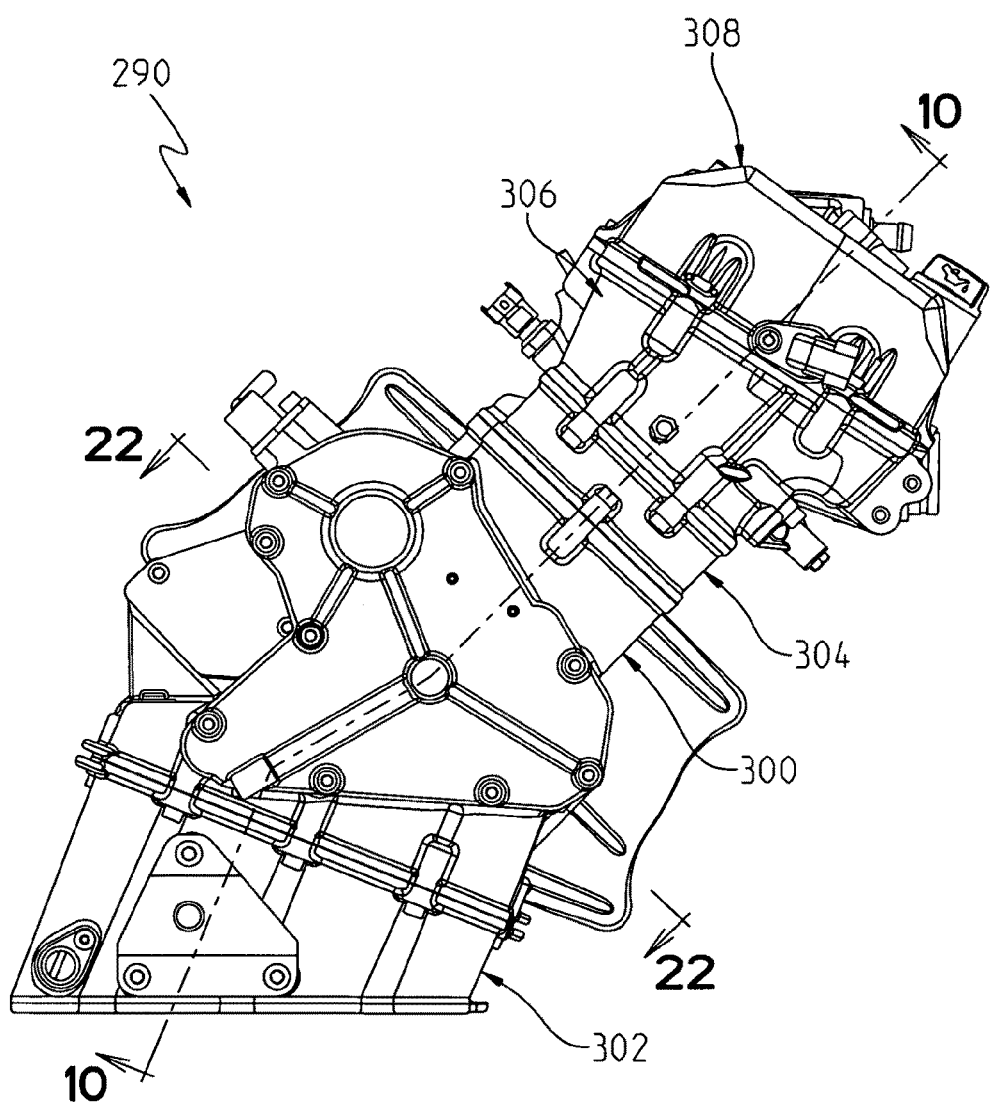
FIG. 9 shows a side view of the engine shown in FIG. 7.
Figure 10:
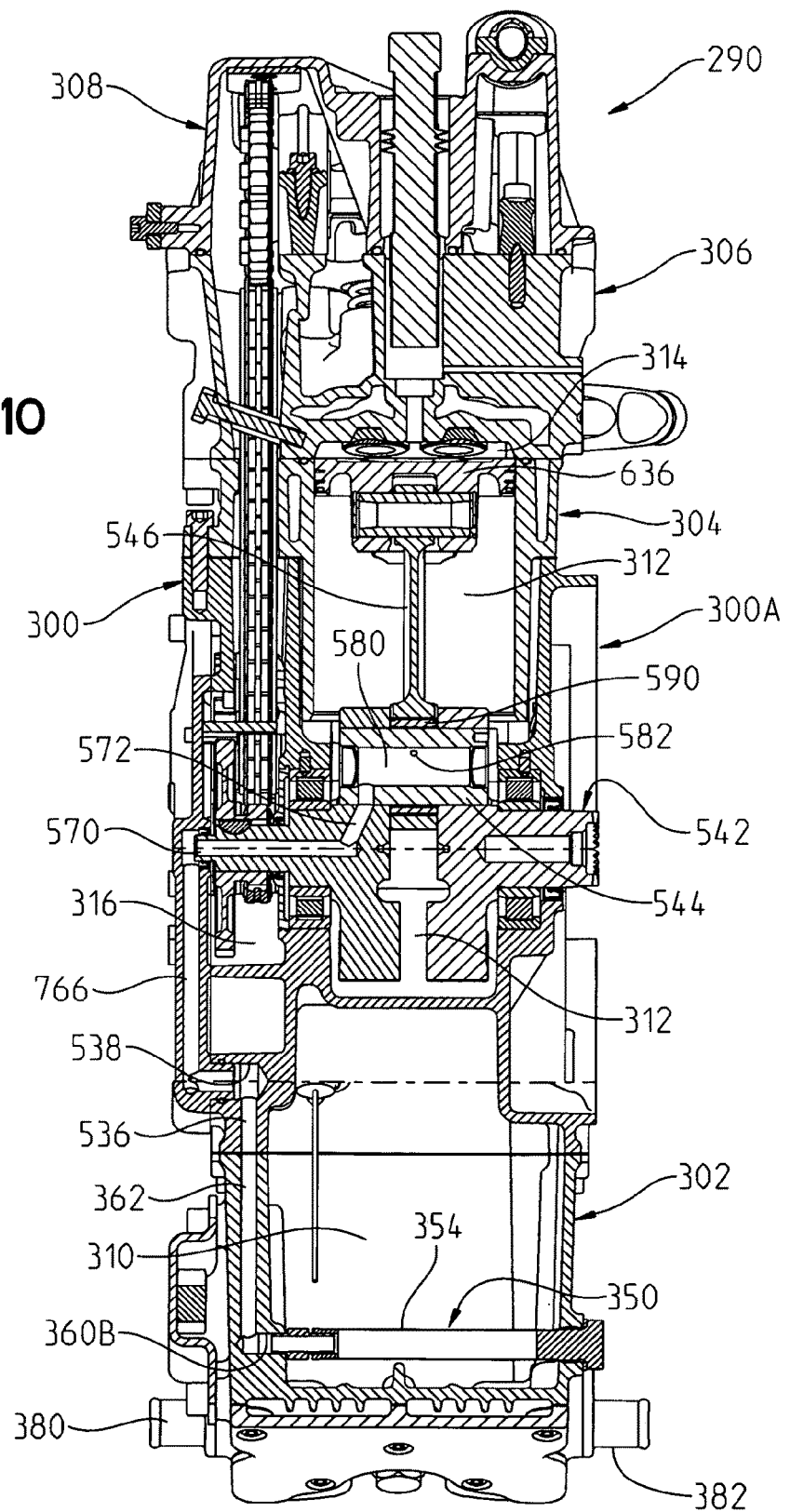
FIG. 10 is a cross-sectional view through staggered lines 10-10 of FIG. 7.

As mentioned above, the system includes a range extender 16, which is comprised of a generator 17 and, as shown in FIGS. 7-9, a 4-cycle engine 290. The engine 290 is comprised of a crankcase housing 300, an oil pan or sump 302, cylinder liner 304, head assembly 306 and valve cover 308. With reference now to FIG. 10, plural chambers are defined in the engine and by the plural sections 300, 302, 304 and 306 such as engine oil sump 310, crank chamber 312, compression chamber 314 and cam shaft chamber 316. With reference now to FIGS. 10, 11 and 12, oil sump 302 will be described in greater detail.

Figure 11A:
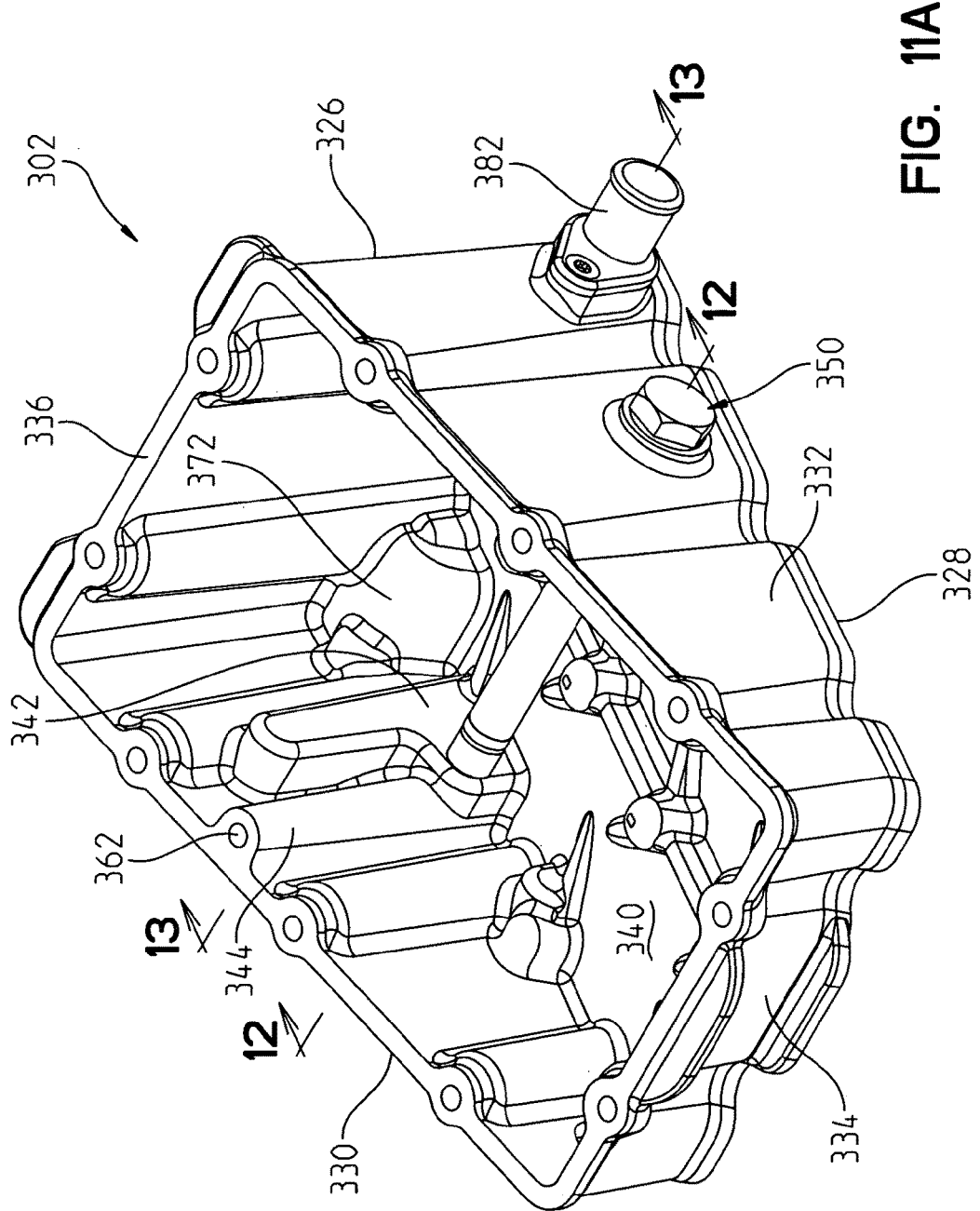
FIG. 11A is a perspective view of the oil sump.
Figure 11B:
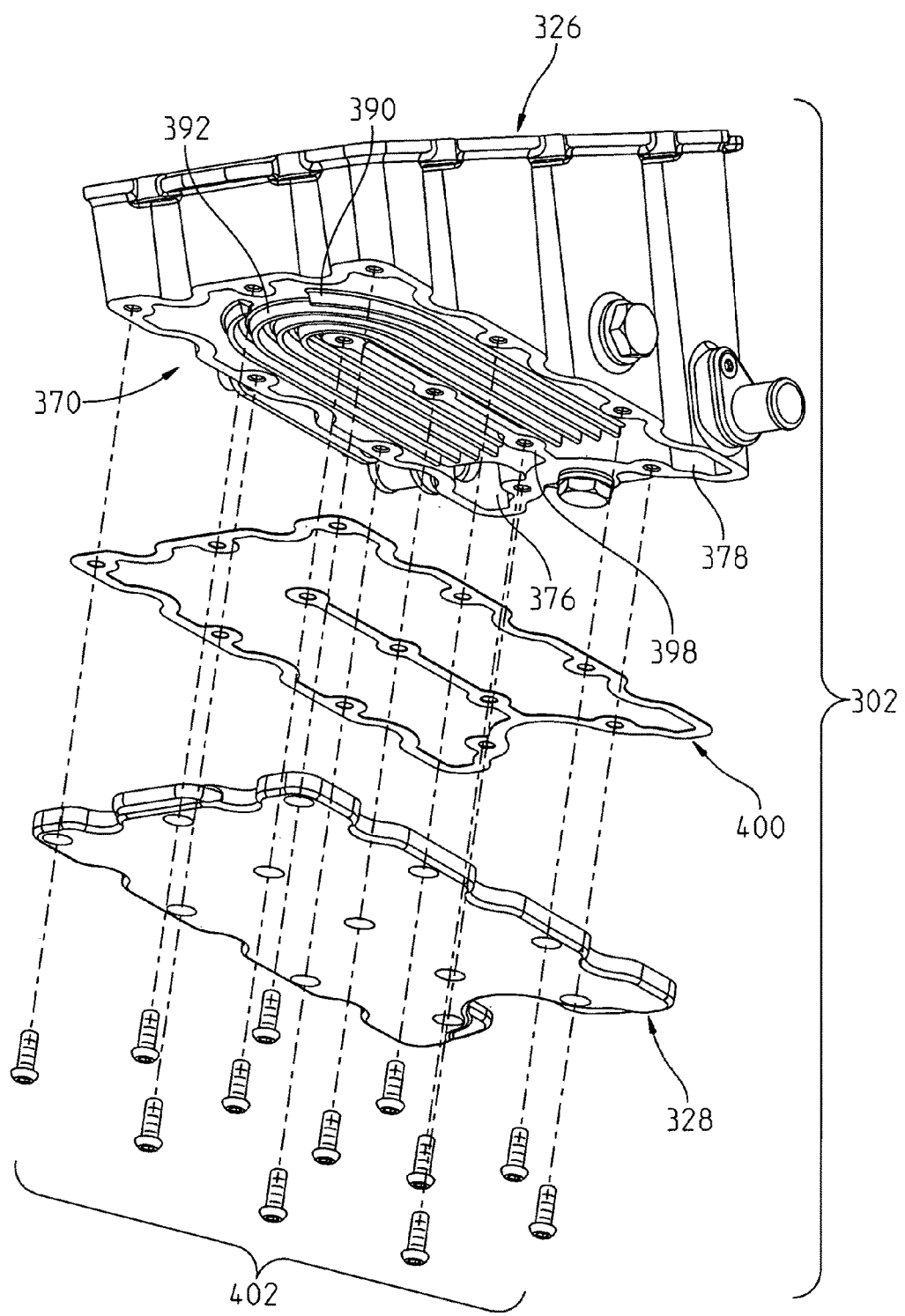
FIG. 11B is an underside perspective view of the oil sump, partially exploded.
Figure 12:
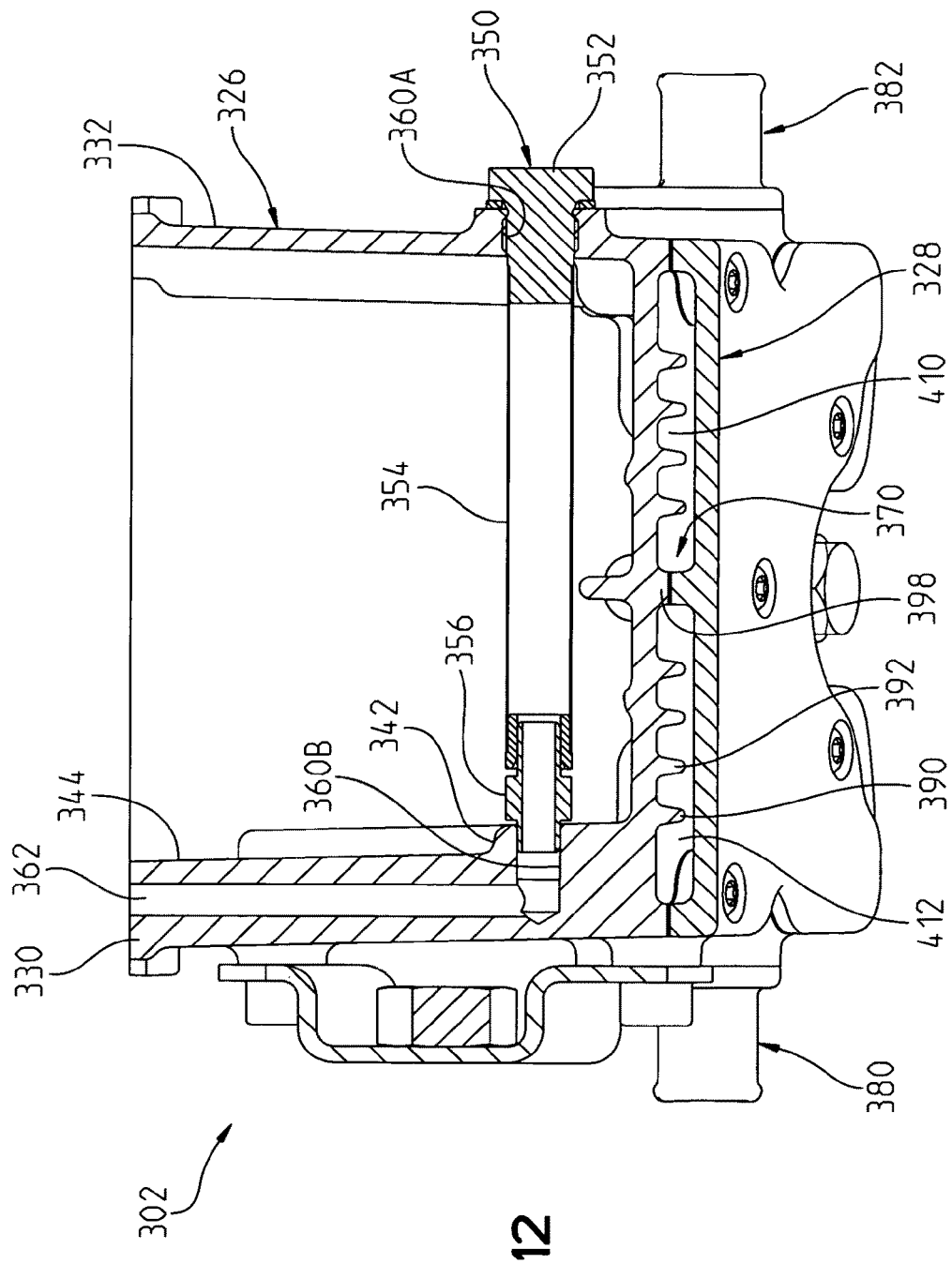
FIG. 12 is a cross-sectional view through lines 12-12 of FIG. 11A.
Figure 13:
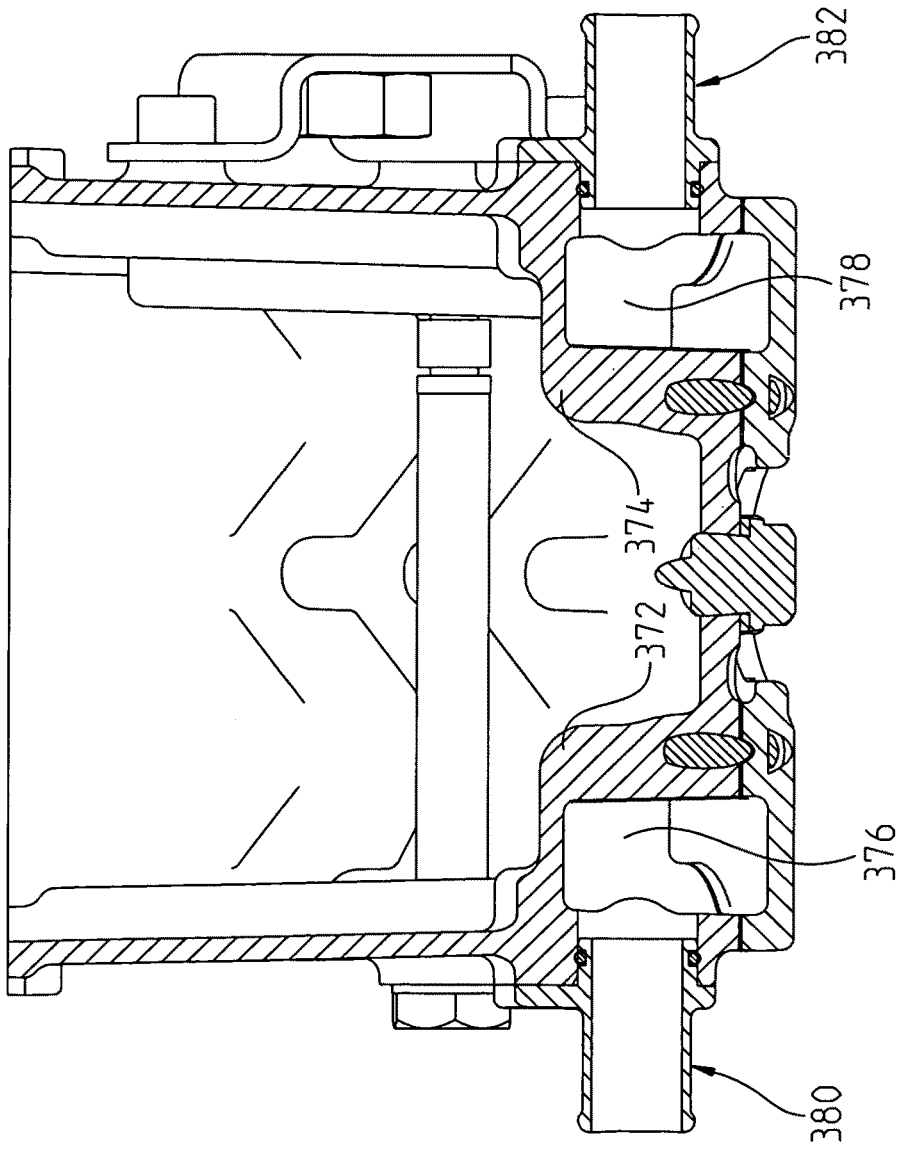
FIG. 13 is a cross-sectional view through lines 13-13 of FIG. 11A.

As best shown in FIGS. 11A and 11B, oil sump 302 is defined by an upper body portion 326 and a lower body portion 328 as described herein. Upper body portion 326 is comprised of side walls 330, 332 and end walls 334, 336. Oil sump 302 also includes a lower floor 340 having a pedestal portion 342 and an integral tubular portion 344 extending upwardly therefrom. With reference now to FIG. 12, a filter assembly 350 is shown installed within the oil sump 302 and includes a threaded bolt portion 352, a tubular filter 354, and a transition section 356. As shown, a hole is drilled from wall 332 towards wall 330, and partially into pedestal 342 defining apertures 360*a* and 360*b*. The tubular portion 344 is also drilled to define a hole 362 which intersects with hole 360*b*. As should be appreciated, hole portion 360*a* is threaded to receive bolt portion 352. This allows filter assembly 350 to be positioned as shown in FIG. 12 with the transition portion 356 positioned in hole 360*b*.

With reference now to FIGS. 11A, 11B, 12 and 13, the oil sump 302 further includes a water fed heat exchanger shown generally at 370 in FIG. 12 and described herein. With reference first to FIGS. 11A and 11B, the upper portion 326 of oil sump 302 includes curved wall portions 372 and 374 (FIG. 11A) defining corresponding concavities 376 and 378 (FIG. 11B). As shown best in FIG. 13, water couplings 380 and 382 communicate with concavities 376 and 378, respectively, and provide water in and out to the heat exchanger 370. With respect now to FIG. 11B, the lower side of oil sump portion 326 includes a plurality of U-shaped fins such as 390, 392 which surround a center wall 398. As shown in FIG. 11B, a gasket 400 is positioned between portions 326, 328 and held together by way of fasteners 402. With respect again to FIG. 12, two separate channels are defined, 410, 412, which communicate with respective water couplings 382, 380, as further described herein.

Figure 14:
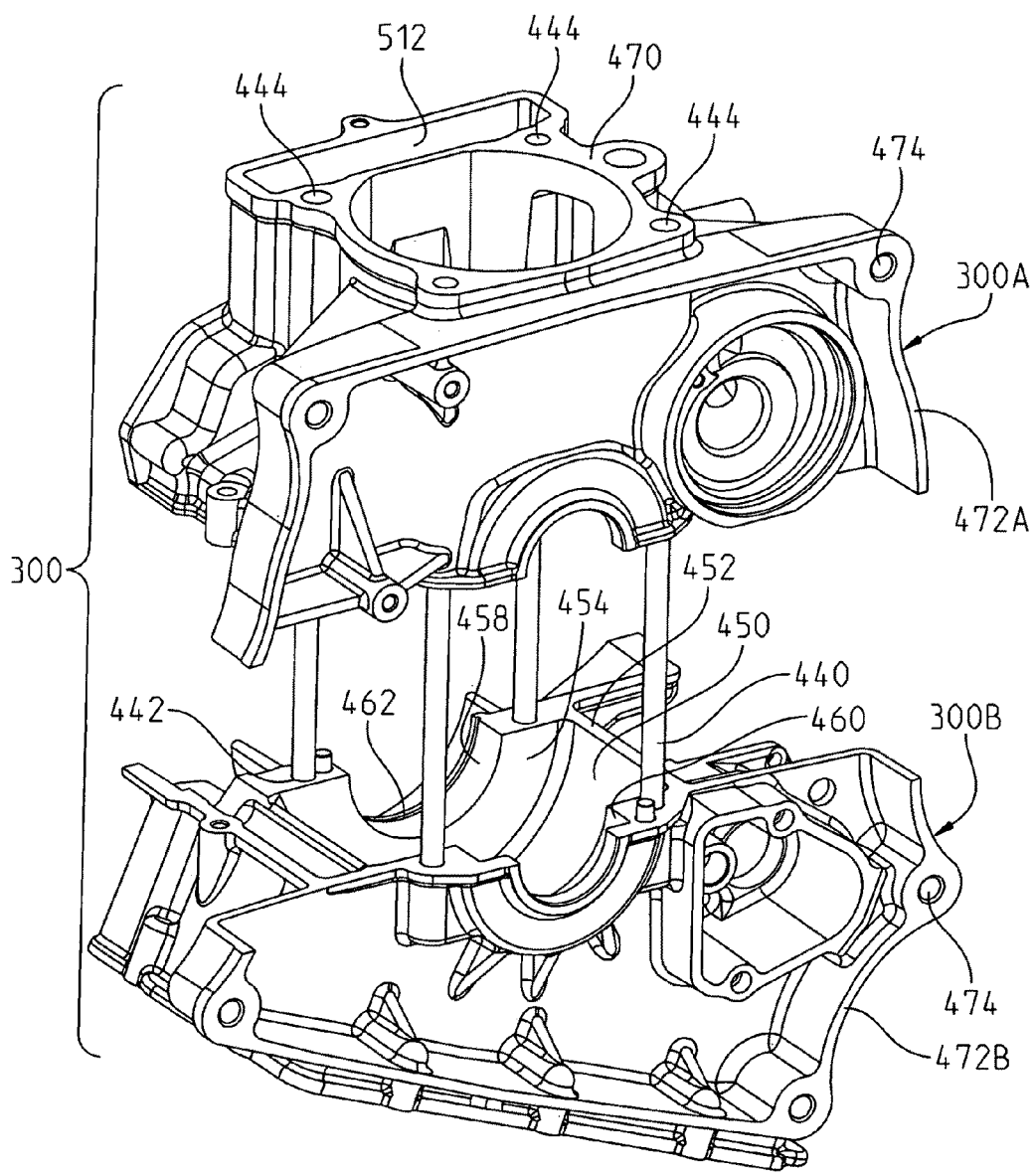
FIG. 14 is an upper partially exploded view of the crank housing from the generator mount side.

With reference now to FIGS. 14-17, crank housing portion 300 will be described in greater detail. As shown, crank housing 300 is shown as a split housing defined by housing portions 300A and 300B. As shown, housing portion 300B has a plurality of threaded studs 440 threadedly received in threaded apertures 442. Housing portion 300A includes corresponding apertures 444 positioned over the studs to complete the housing assembly. As shown in FIG. 14, the lower housing portion 300*b* defines a crankshaft chamber 450 bound by a semi-circular wall 452 and end walls 454 and 456. Each of the end walls 454, 456 define bearing surfaces 458, 460 as described herein.

Figure 15:
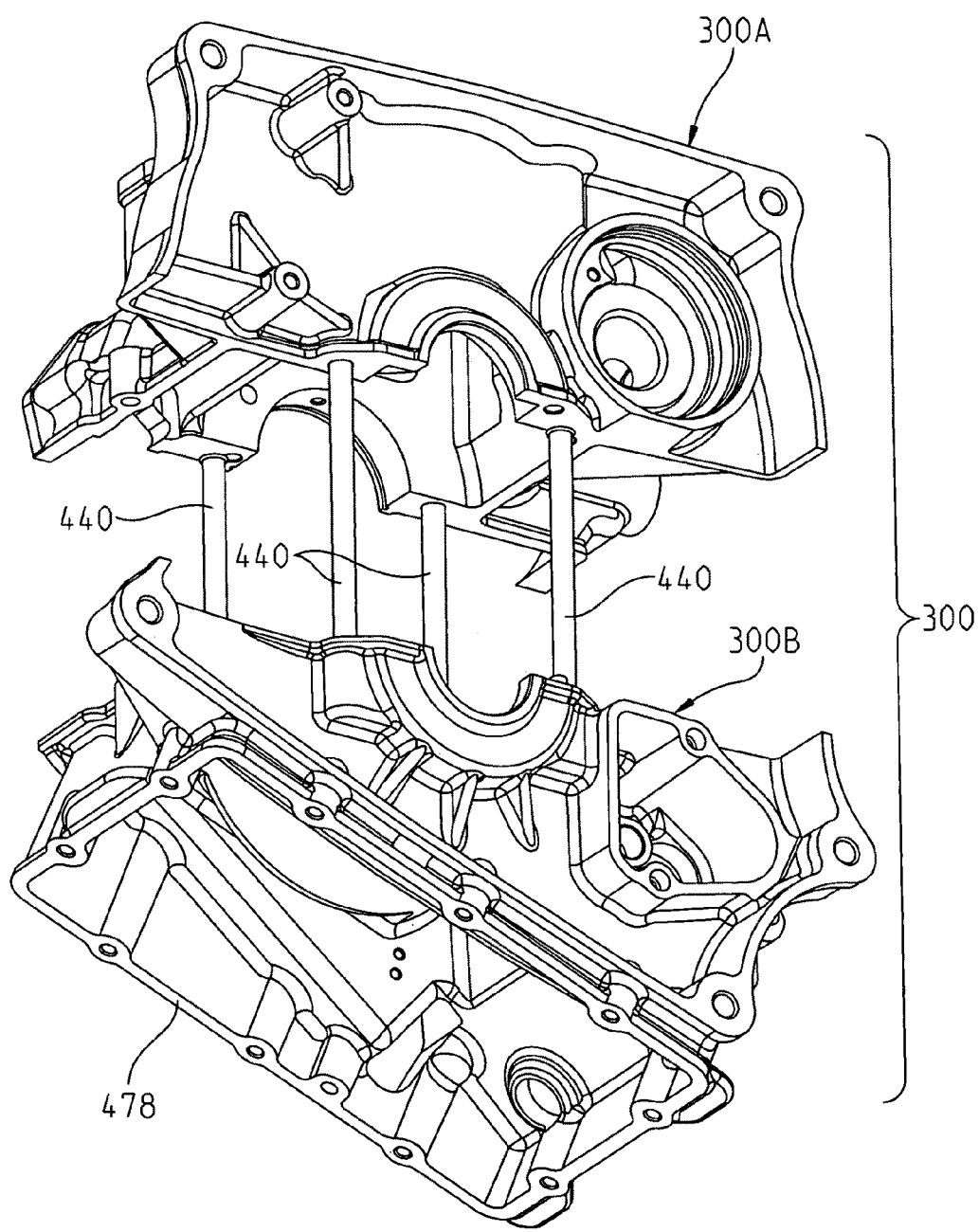
FIG. 15 is a lower partially exploded view of the crank housing from the generator mount side.
Figure 16:
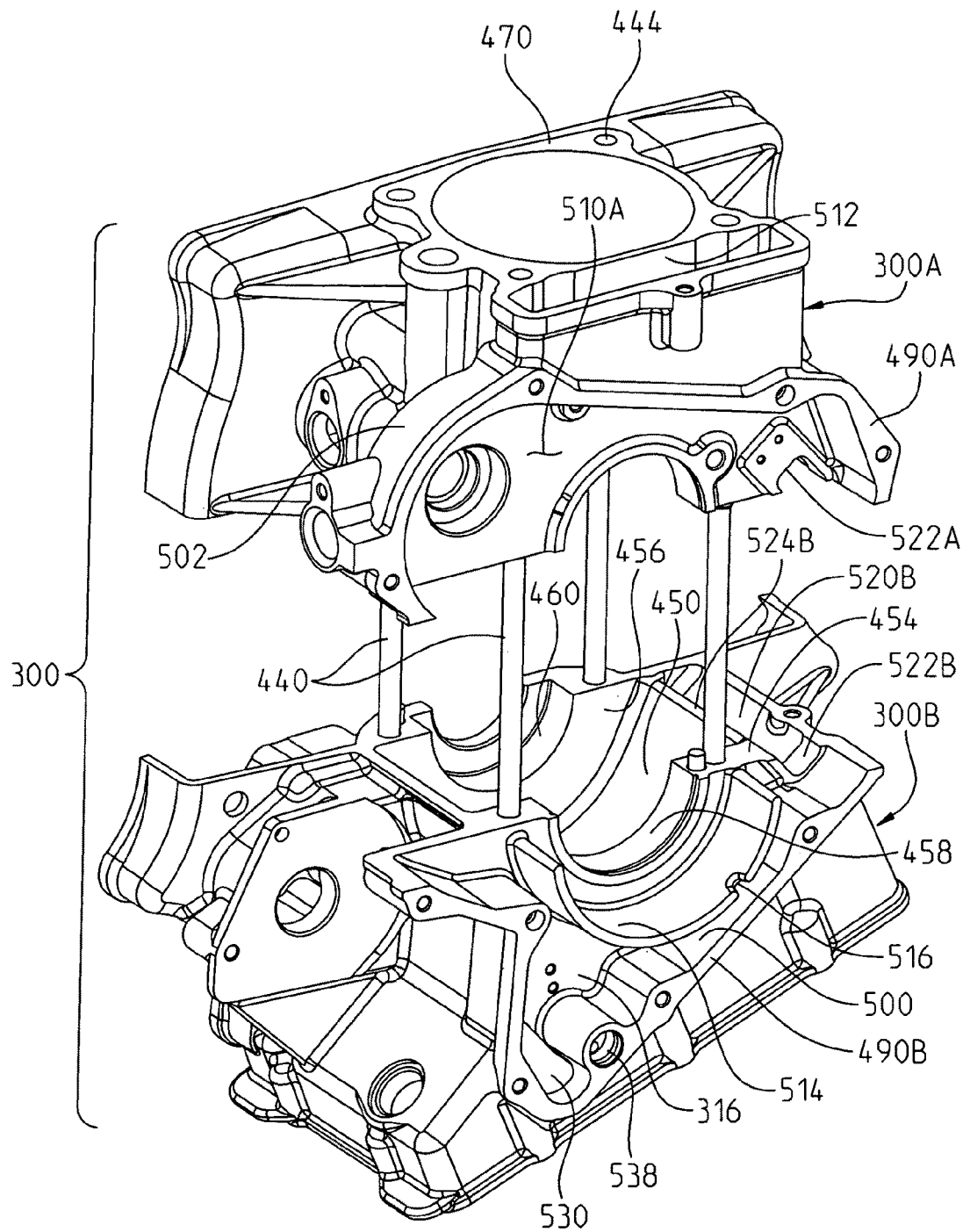
FIG. 16 is an upper partially exploded view of the crank housing from the cam chain drive side.
Figure 17:
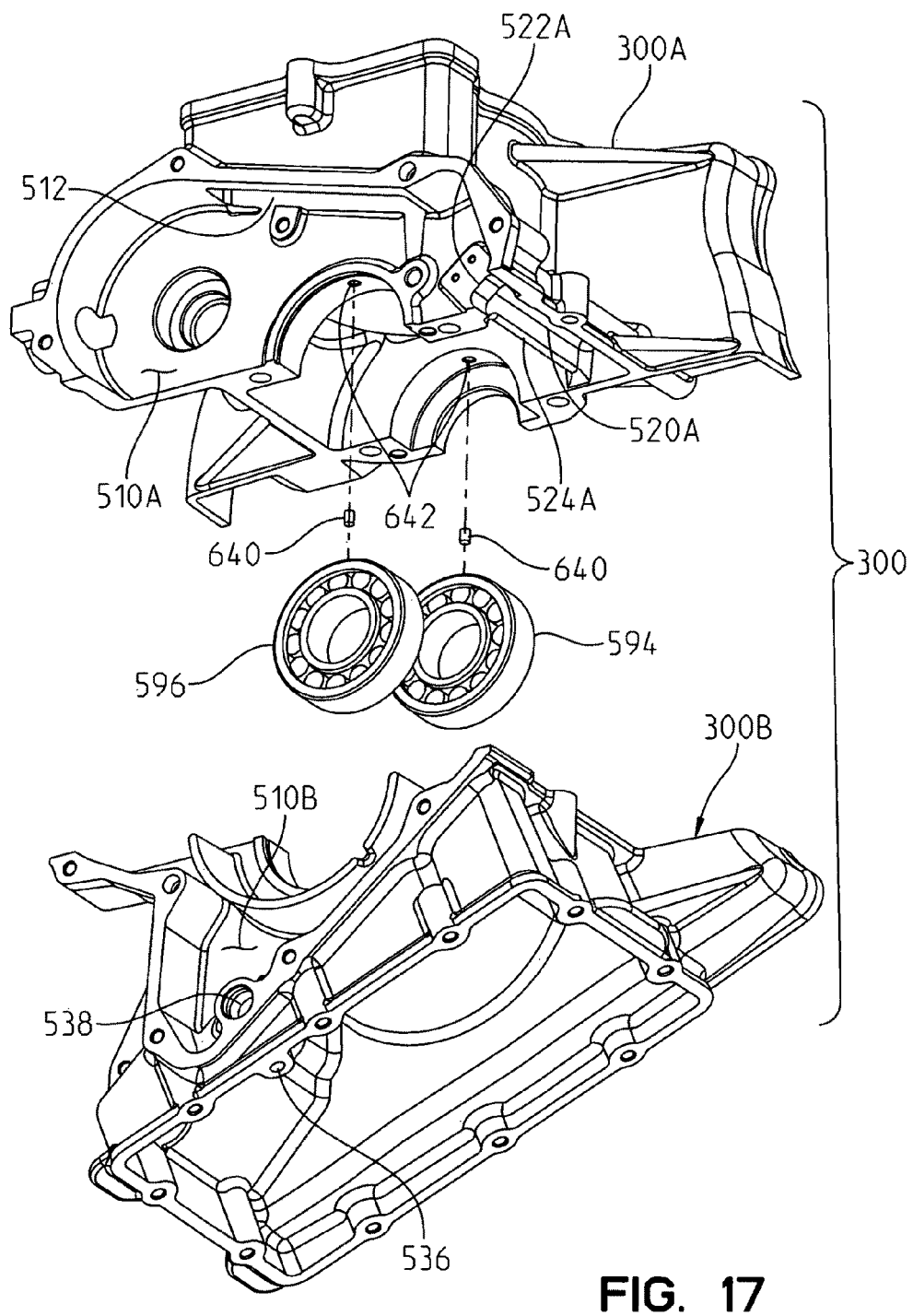
FIG. 17 is a lower partially exploded view of the crank housing from the cam chain drive side.

The crank housing 300 also defines a plurality of mounting faces or flanges. For example, as shown in FIG. 14, a top face 470 is defined for mating with the cylinder liner portion 304 as described herein. A generator mounting face is also defined by 472A and 472B, and has a plurality of mounting apertures at 474. As shown in FIG. 15, a lower mounting face 478 is provided for mounting with the oil sump 302. With reference now to FIG. 16, the two housing halves 300A, 300B also define a mounting face 490A, 490B which receive a cover as further described herein. Cam chain chamber 316, FIG. 16, is at least partially defined by the wall 500 on housing portion 300B and the wall 502 on housing portion 300A. Thus when the housing parts 300A and 300B are positioned together, the cam chain chamber 316 surrounds bearing surface 458 and is also bounded by a rear wall defined by surfaces 510A on housing portion 300A and 510B on housing portion 300B. As shown in either of FIG. 14 or 16, a cam chain channel 512 is provided which communicates through the upper surface 470 of crank housing 300 and also opens into cam chain chamber 316 as best shown in FIG. 17. As also shown in FIG. 16, housing portion 300B also includes a semi-cylindrical wall 514 extending forwardly from surface 510B, having an access notch 516, as further described herein.

As best shown in FIGS. 16 and 17, a channel is defined adjacent to crank chamber 450 defined by channel halves 520A (FIG. 17) and 520B (FIG. 16). A port is defined by portions 522A and 522B (FIG. 16) which in turn communicates with the channel defined by 520A and 520B. It should be understood that the inner wall 524A (FIG. 17) and the inner wall 524B (FIG. 16) define a spaced apart slot therethrough such that the crank chamber 450 communicates with the channel defined by channel portions 520A and 520B. Furthermore, the port defined by portions 522A and 522B is the only communication between the crank channel 450 and the cam channel 316. Meanwhile the only communication between the cam shaft chamber 316 and the oil sump chamber 310 is through opening 530 (FIG. 16) at the lowest point of this continuous wall 500. Finally, an oil inlet is defined by apertures 536 (FIG. 17) and 538 (FIGS. 16 and 17). It should also be appreciated that aperture 536 is profiled to correspond with aperture 362 (FIG. 12).

Figure 18:
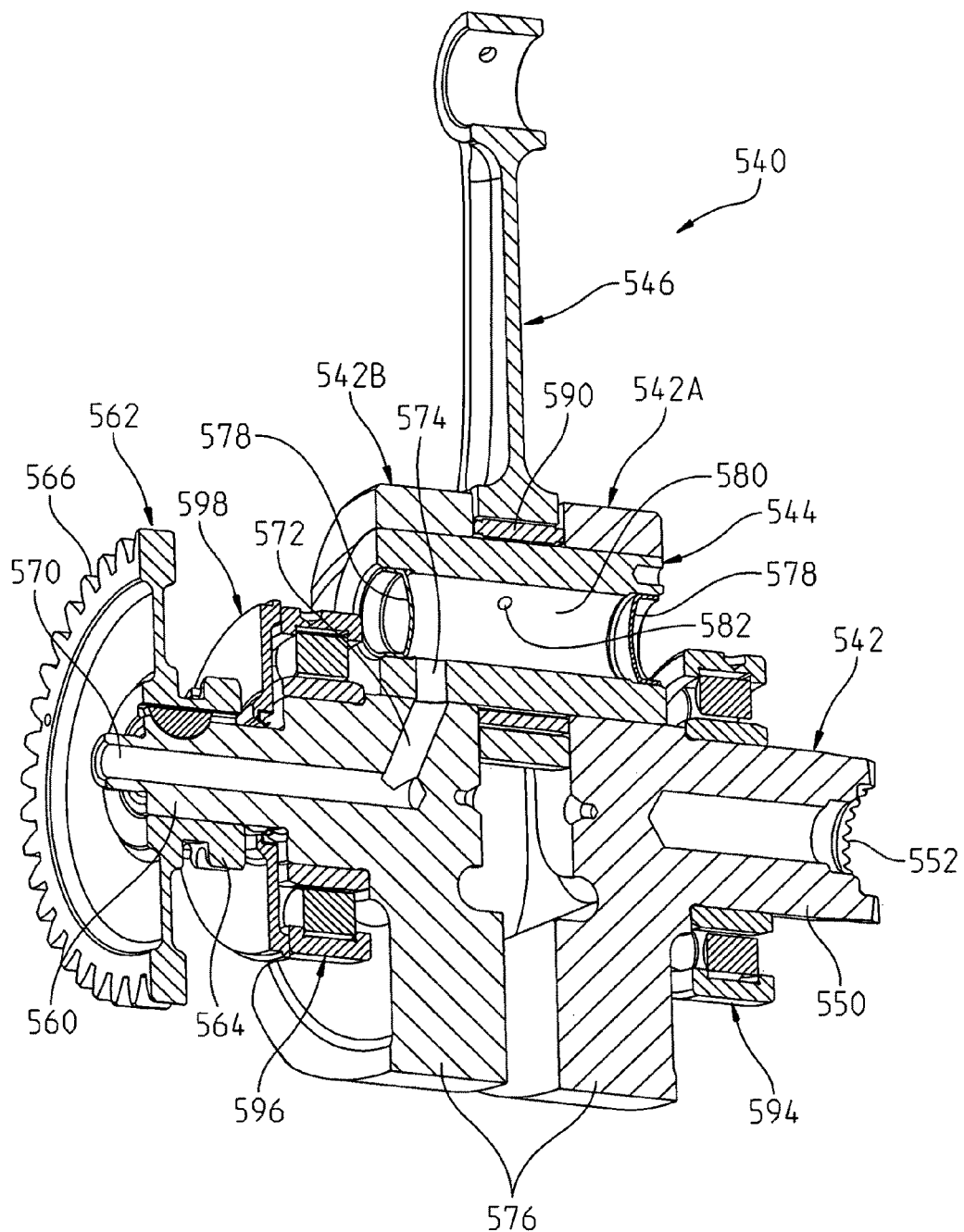
FIG. 18 shows a cut away perspective view of the crank assembly.
Figure 19:
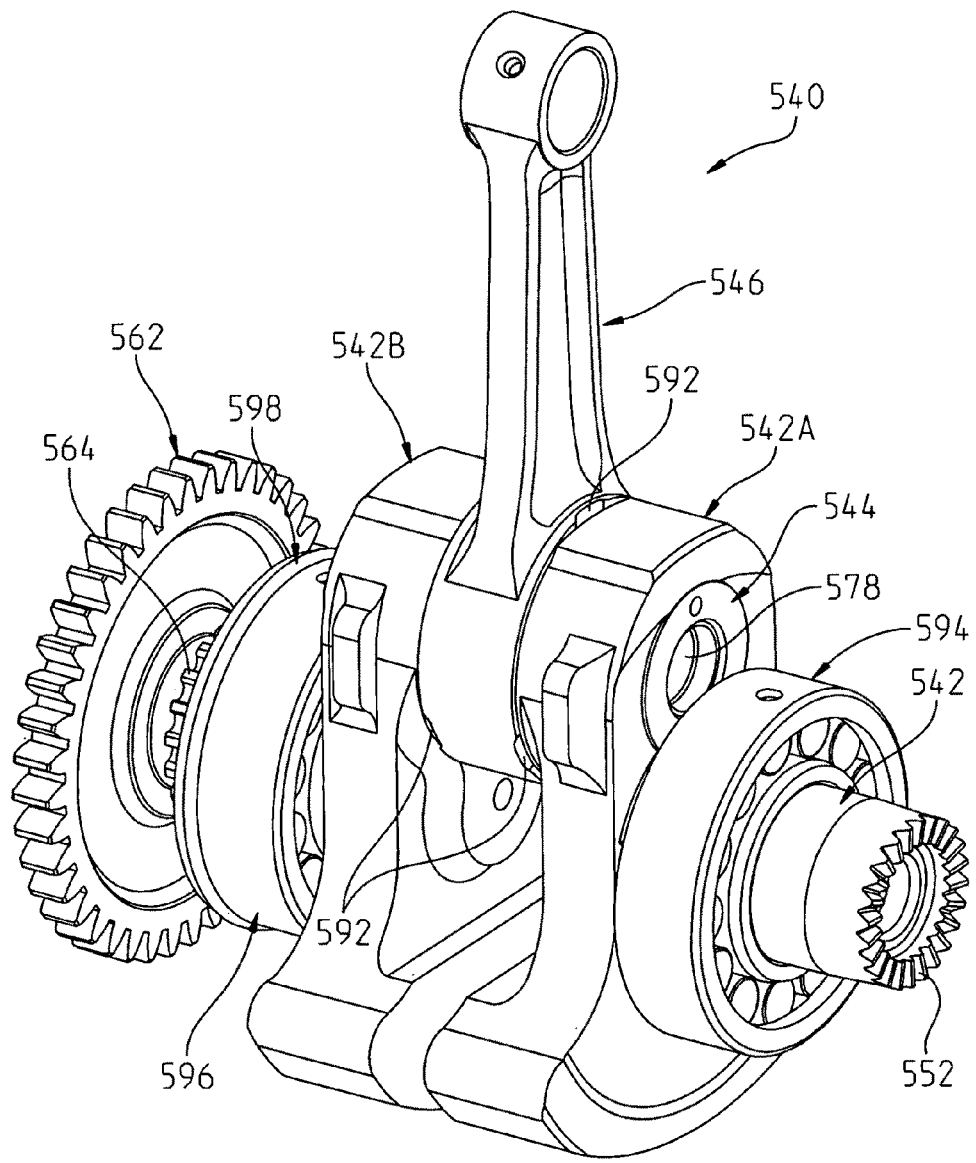
FIG. 19 shows an upper perspective view of the crank assembly.

With reference now to FIGS. 18 and 19, the crankshaft assembly is shown generally at 540. The assembly 540 is comprised of a crankshaft 542, which has a split shaft having halves 542A and 542B connected together by way of pressed pin 544; and a connecting rod 546. The crankshaft 542 also includes two output shaft ends, a first shaft end 550 having a coupling surface at 552 and a second shaft end 560 which is keyed to a gear set 562 having a small diameter gear 564 and a large diameter gear 566, as further described herein. As also shown, the end of shaft 560 is bored to provide an aperture at 570 which in turn communicates with bore 572 through crankshaft portion 542B. As shown, pin 544 includes a bore at 574 which aligns with bore 572. Counterweights are provided at 576.

Finally, pin 544 includes end caps 578 defining an inner pin volume at 580, and an access opening 582 positioned between the crankshaft portions 542*a*, 542*b*. As shown, connecting rod 546 is shown positioned between the crankshaft halves 542*a*, 542*b* and rotatably mounted to pin 544 by way of a needle bearing at 590. As best shown in FIG. 19, the connecting rod 544 has three indents 592 on each side of the connecting rod, as further described herein. Two roller bearings 594 and 596 are positioned on opposite sides of pin 544 and rotatably mount the crankshaft assembly 542 as further described herein. Lastly, a wiper seal 598 is provided adjacent to roller bearing 596 as further described herein.

Figure 20:
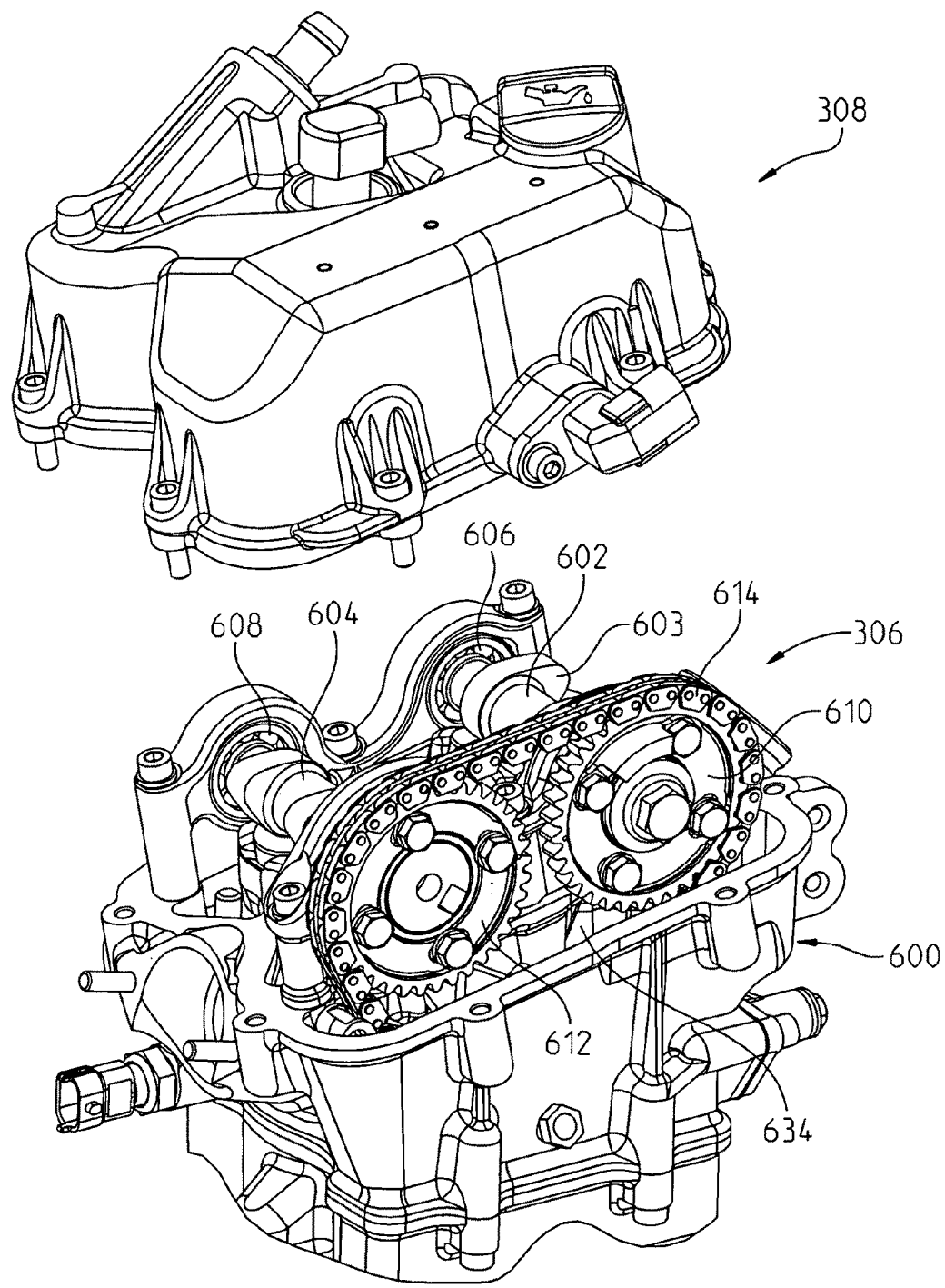
FIG. 20 shows an upper perspective view of the head assembly and valve cover.
Figure 21:
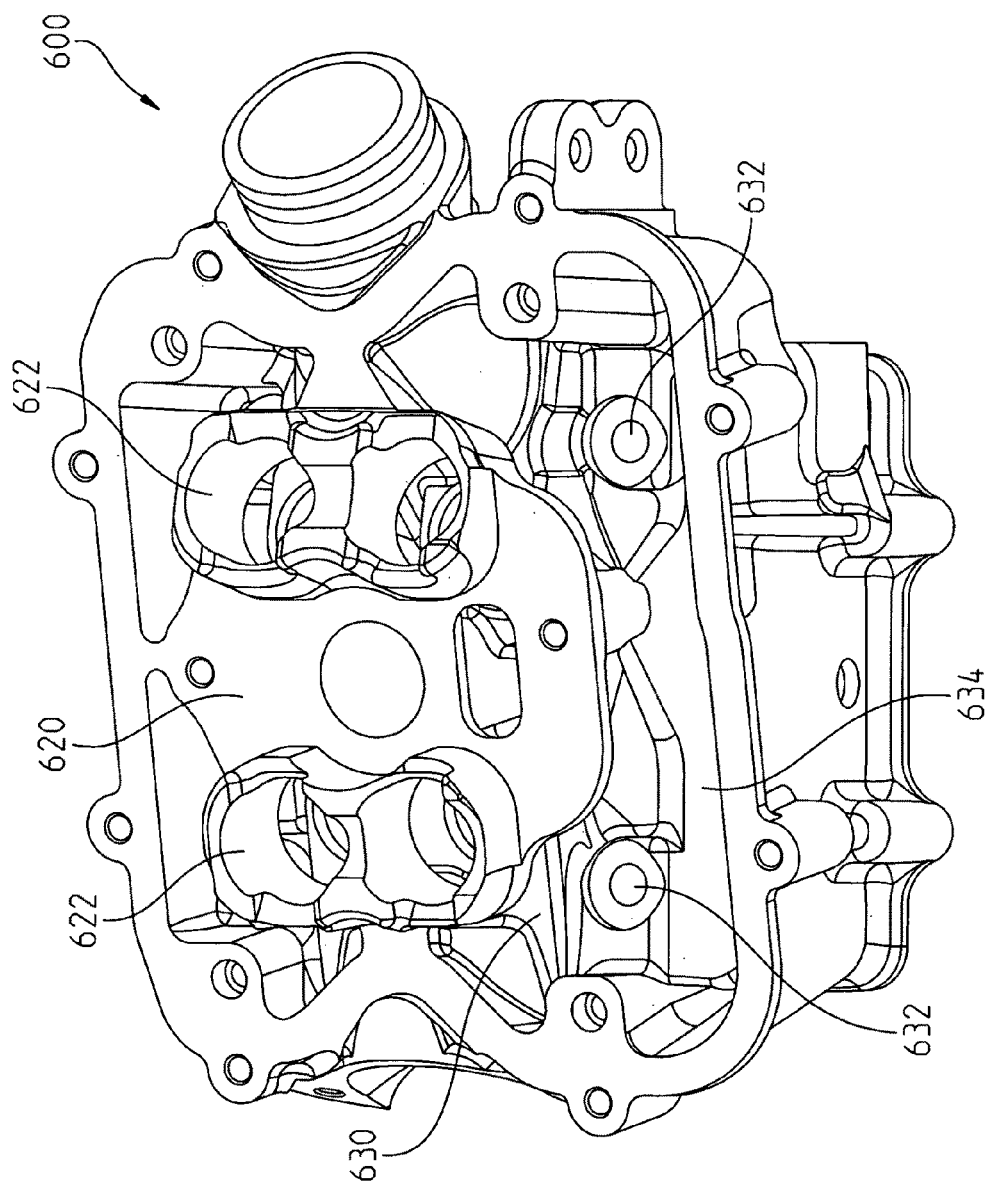
FIG. 21 is a perspective view of the head casting portion.

With reference now to FIG. 20, the head assembly 306 is shown having a main body portion 600. Assembly 306 includes double overhead cams 602, 604 which are rotatably mounted in pairs of roller bearings 606 and 608 (only one of each pair is viewed in FIG. 20). Cams 602 and 608 are driven by respective gears 610, 612 and by timing chain 614. It should be appreciated that timing chain 614 is trained around gear 564 (FIG. 19), such that the crankshaft rotation drives the camshafts 602, 604. As shown best in FIG. 21, housing 600 includes an upper wall 620 having the valve ports 622 and a lower wall 630 having apertures 632 therethrough. An access channel is provided at 634, which is profiled to communicate with channel 512 (FIGS. 16, 17) and to allow the chain 614 to pass upwardly to the gears 610, 612.

Figure 23:
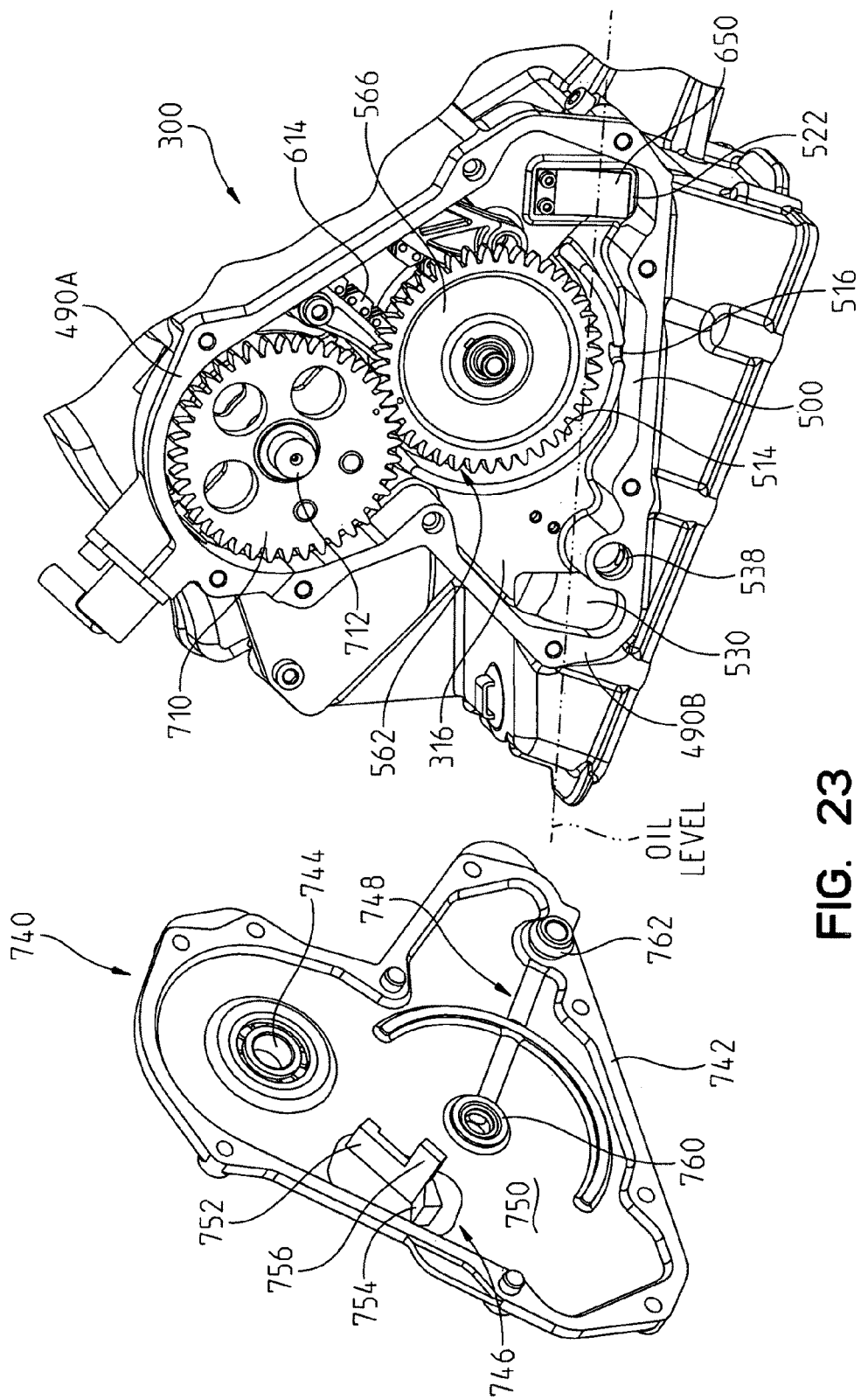
FIG. 23 shows the inner cam chain cavity with the cover removed.
Figure 24:
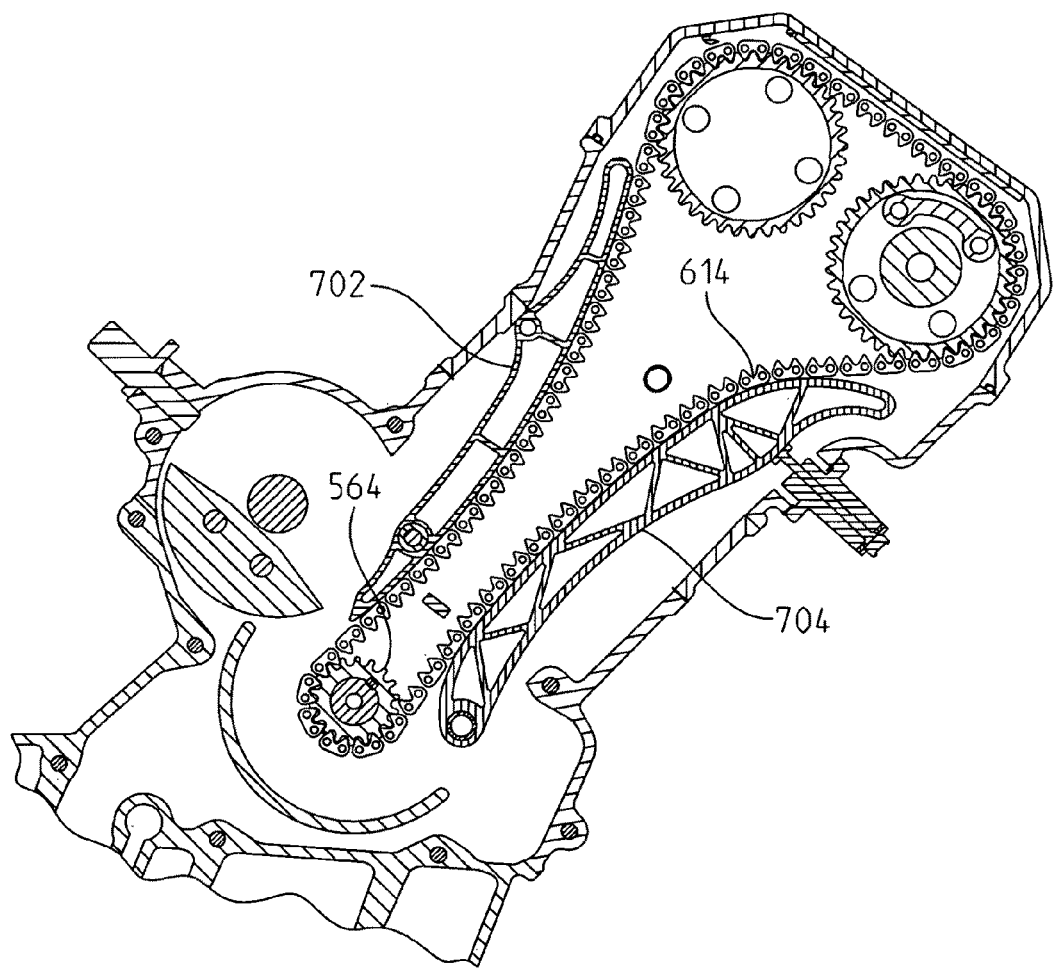
FIG. 24 shows a cross-sectional view through lines 24-24 of FIG. 22.

With reference now to FIGS. 23 and 24, other aspects of the engine will be described. As shown in FIG. 23, a reed valve 650 is positioned over and covers port 522. As shown in FIG. 24, chain guides 702, 704 are provided for guiding the chain 614 and for maintaining the proper chain tension. With reference again to FIG. 23, a balancing gear 710 is provided in meshed engagement with gear 566, which is driven by the crankshaft 542. Gear 710 has a shaft 712 rotatably mounted as described herein.

As shown in FIG. 23, a cover 740 is also shown having a flange 742 which mates with flange surfaces 490A and 490B of crankcase assembly 300. Cover 740 further includes an oil distribution scraper or member 746, an oil distribution channel 748, and a roller bearing 744 which overlies shaft 712 of balance gear 710. As shown, scraper 746 is attached to an inside surface 750 of cover 740 and includes an elongate rail 752 and a short rail 754. An extended tongue 756 projects beyond rail 752, 754 as further described herein.

Figure 22:
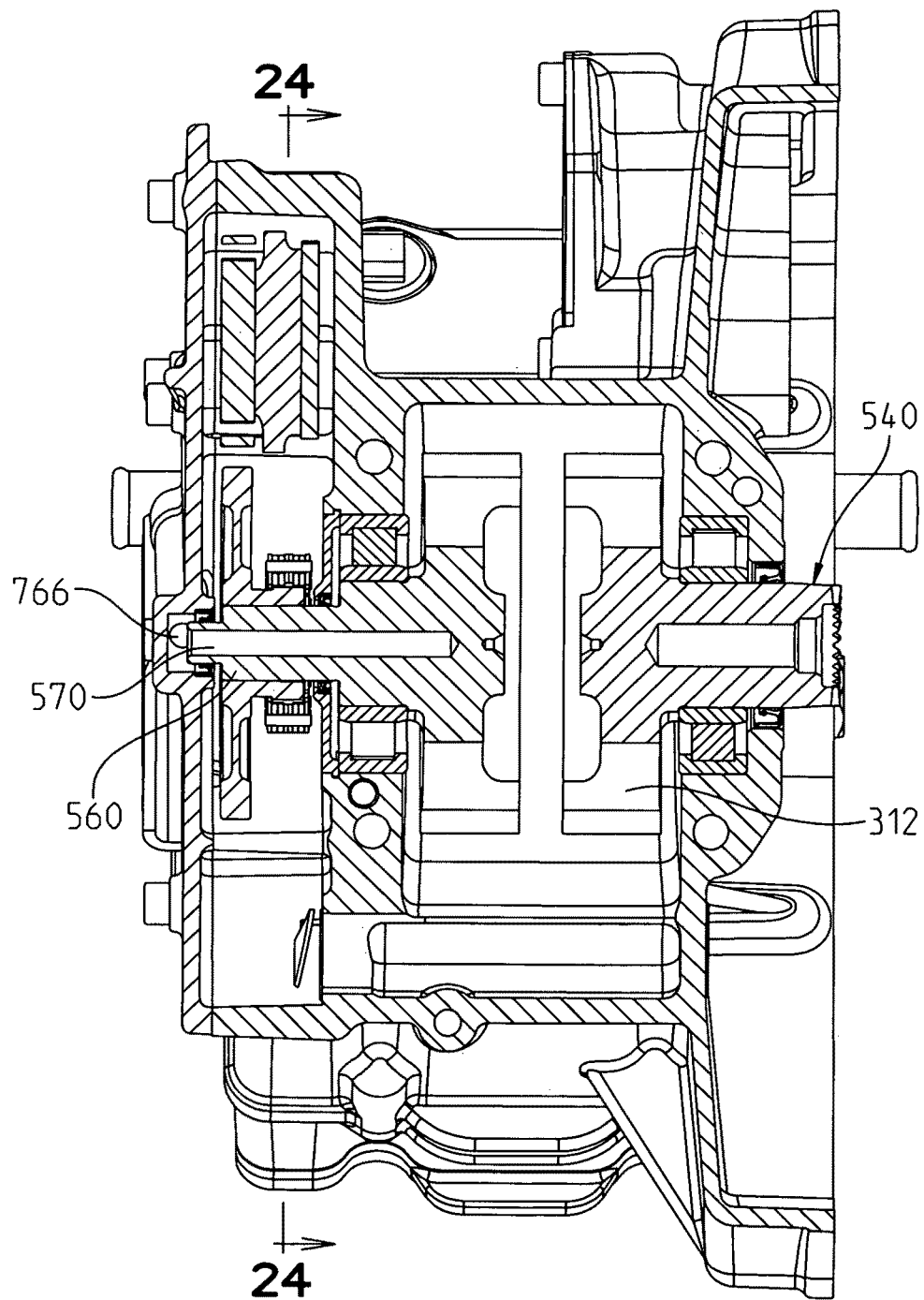
FIG. 22 is a cross-sectional view through line 22-22 of FIG. 9.

Oil distribution channel 748 is comprised of a first seal 760 profiled for receipt over crankshaft end 560, encompassing oil channel 570 (FIG. 22). A second seal 762 is profiled to be positioned in aperture 538. Finally, an oil channel is defined within cover 740 at 766 as best shown in FIG. 10.

Figure 25:
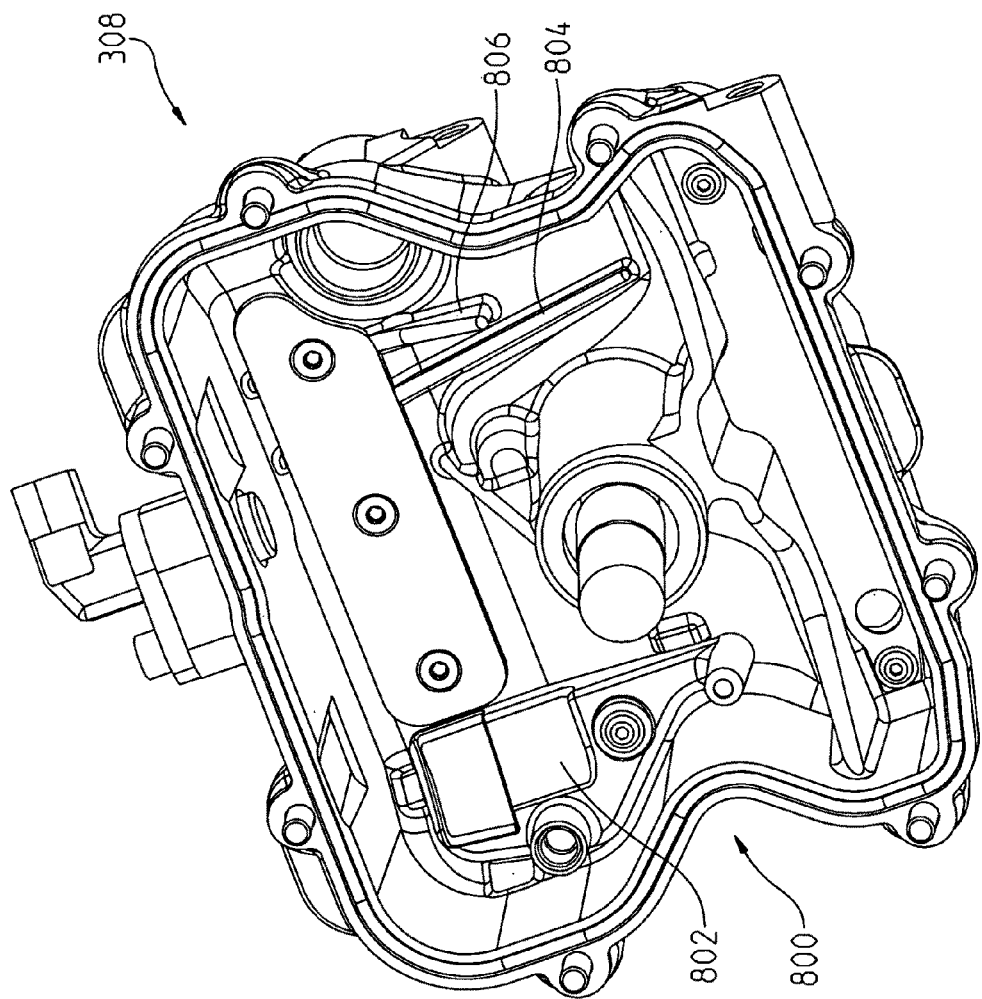
FIG. 25 shows an underside perspective view of the valve cover.
Figure 26:
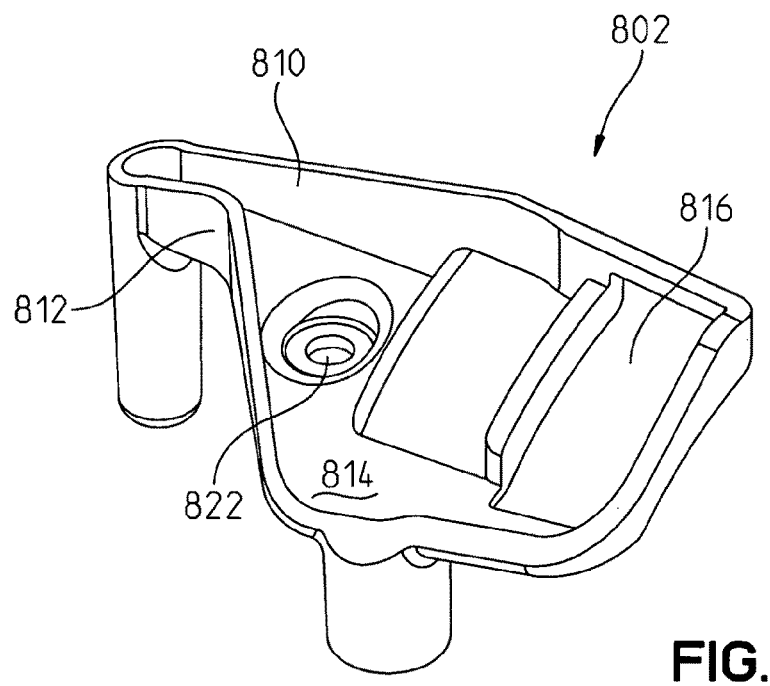
FIGS. 26 and 27 show perspective views of the oil distribution mechanism located within the valve cover.
Figure 27:
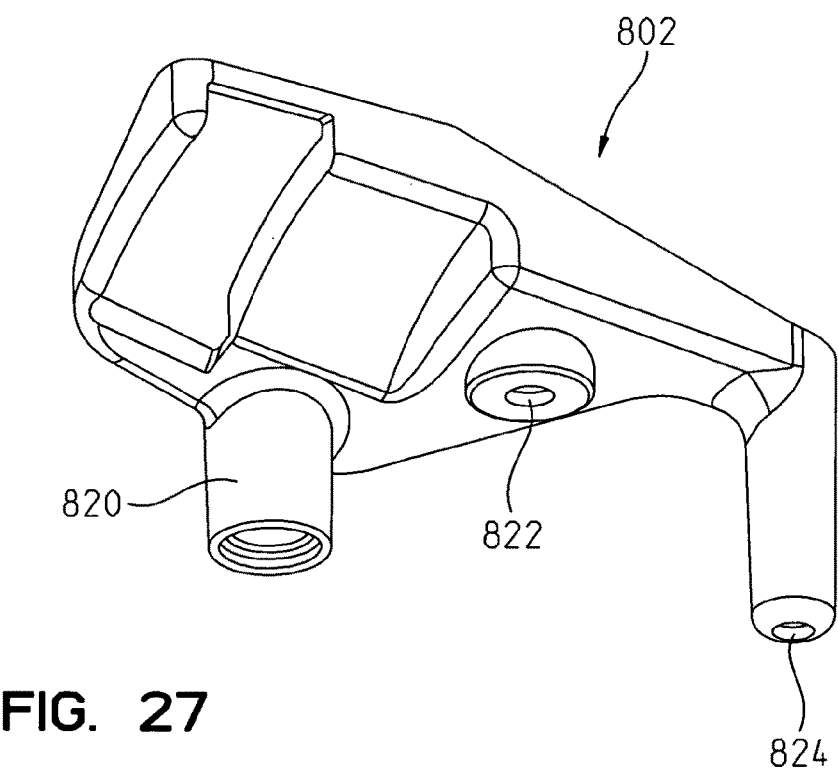

With reference now to FIG. 25, valve cover 308 is shown from an underside view with oil distribution assembly 800 shown including a distribution member 802 for valve tappets/cams and rails 804, 806 for lubricating cam shaft 602 (FIG. 20). As shown in FIGS. 26 and 27, distribution member 802 comprises an upper tray 810 having a perimeter wall 812 extending around the tray and around a floor 814. A window 816 extends through the floor 814 and is profiled for residing over cam chain 614 as described herein. Mechanism 802 further includes a mounting boss 820 and openings 822 and 824 which communicate with the inner tray 814.

With the above particulars of the engine described, the assembly of the engine will now be described. With reference first to FIGS. 11b and 12, it should be understood that the oil pan 302 is assembled by placing the lower portion 328 and gasket against the lower surface of portion 326 and providing fasteners to assemble the two components, 326, 328 together. Oil filter assembly 350 is also installed as shown in FIG. 12.

As shown in any of FIGS. 14-17, studs 440 are threadably received in threaded openings 442 whereupon the crankshaft assembly 540 (as shown in FIG. 18) is positioned within crankshaft chamber 450 (FIG. 14). This positions roller bearing 594 (FIG. 14) on surface 460 (FIG. 14) and roller bearing 596 (FIG. 18) on surface 458 (FIG. 14). This also positions seal 598 within groove 462 (FIG. 14). It should be appreciated that this positions the gear set 562 (FIG. 18) overlying the semi-cylindrical wall 514 as best shown in FIG. 23. It should also be appreciated that the cam chain 614 would be laced around drive gear 564 prior to insertion in crankcase lower half 300b.

With the crankshaft sub-assembly positioned as described above, the upper portion 300A of the crankcase assembly may now be slidably received by positioning apertures 444 over each of the corresponding studs 440 as best shown in FIG. 16. As shown in FIG. 17, upper crankcase housing 300б is received over roller bearings 594, 596 with pins 640 locating the bearings within receiving apertures 642 to prevent the outer race of bearings 594, 596 from spinning during the rotation of the crankshaft. It should also be appreciated that during the assembly of the upper crankcase housing portion, the cam shaft drive chain 614 is fed upwardly through aperture 512 (FIG. 17) to pull the chain upwardly through the crankcase.

With respect now to FIG. 10, with a piston 636 attached to connecting rod 544, cylinder liner 304 may now be placed over piston 636 and downwardly to be received on the top surface 470 (FIG. 16) of the upper crankcase housing 300A. While not specifically described, it should be appreciated that cylinder liner 304 has apertures which match with studs 440 such that cylinder liner stacks on top of crankcase housing 300a, as best shown in FIG. 10.

With the head assembly 306 as shown in FIG. 20, head assembly 306 is positioned over studs 440 with holes 632 (FIG. 21) received therein. It should be appreciated that studs 440 have a length appropriate to be received through apertures 632 with enough clearance to receive fastening assemblies such as washers and fastening nuts. The cam chain 614 is then assembled around associated cam drive gears 610, 612 to the position shown in FIG. 20. Valve cover 308 may then be attached over head assembly 306 by way of fasteners.

Figure 28:
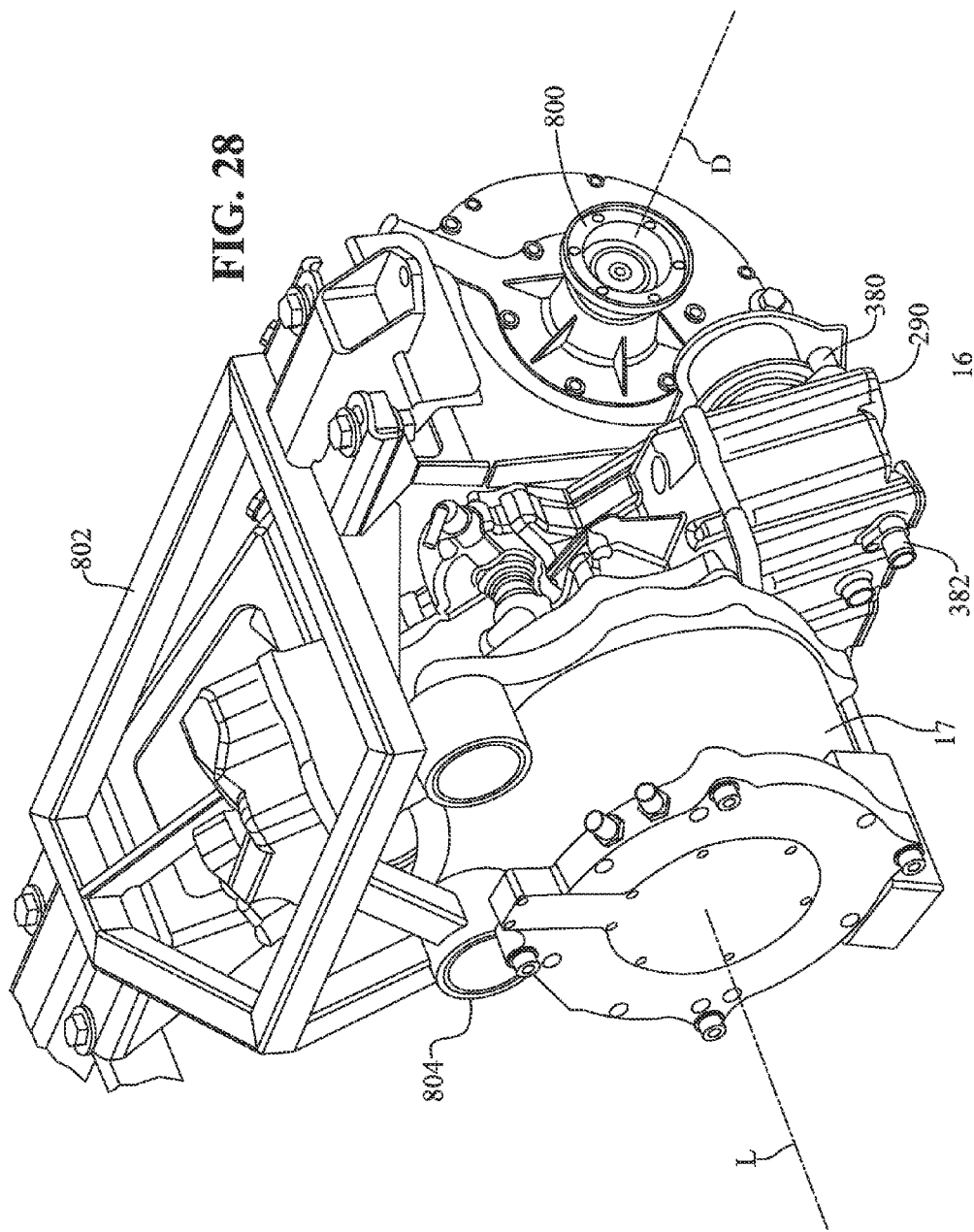
FIG. 28 shows a perspective of a potential mounting orientation and structure for the range extender within a vehicle.
Figure 29:
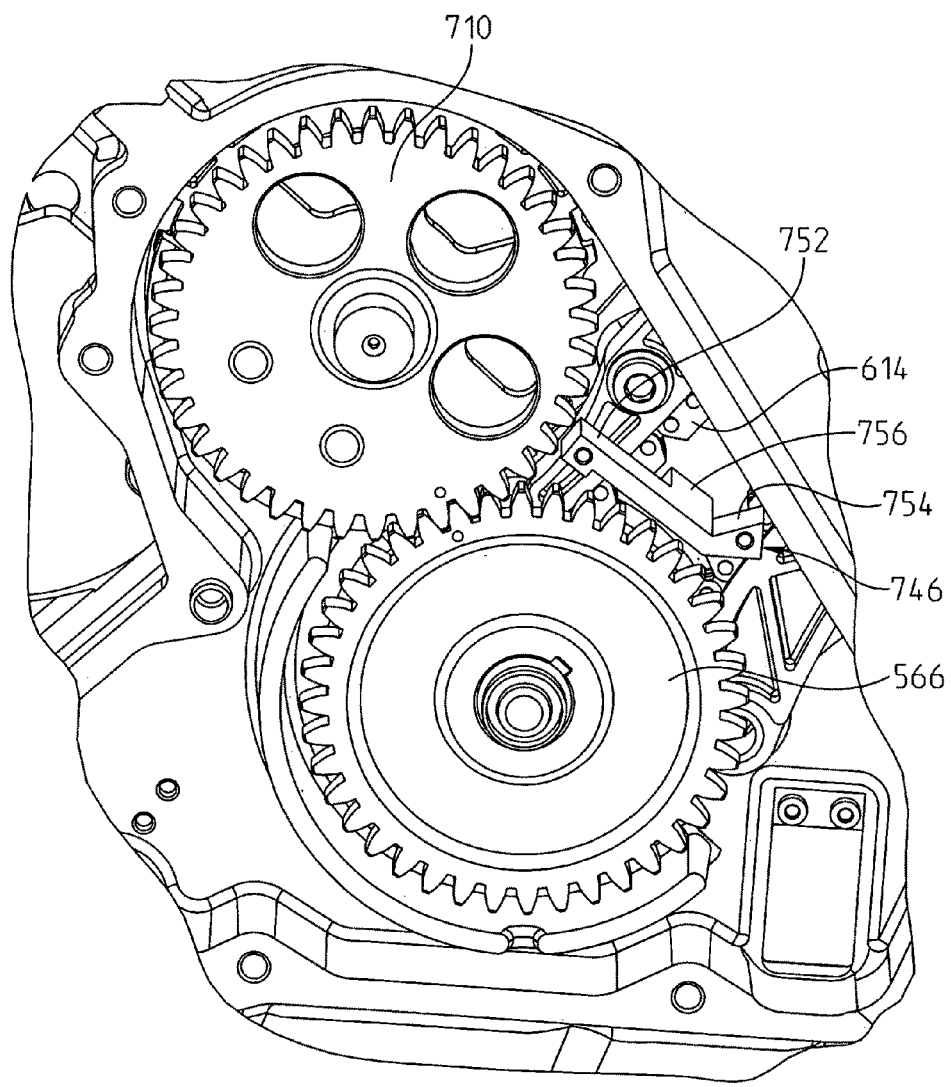
FIG. 29 shows an enlarged view through the cam shaft drive chamber showing the oil scraper positioned between the links of the cam chain.

With reference now to FIG. 28, the range extender assembly 16 is shown mounted within a vehicle forward of the drive motor 48. The range extender engine 290 is attached to generator 17 where generator 17 is mounted along, and facing forward relative to, longitudinal axis L. Drive motor 48 has output drive couplings 800 arranged along a transverse drive axis D. As shown, a frame bracket 802 is provided having mounting cylinders 804 which include rubber grommets to mount the range extender assembly 16 at three positions.

As mentioned above, the range extender 16 only operates for the purpose of charging the system batteries and therefore is not constantly running. For that purpose, the oil is preheated by way of system water flowing through couplings 380, 382. This flow of water is constant during the operation of the vehicle in order to maintain the oil at a proper operating temperature. For that same reason, the catalytic converter of the range extender is also preheated for a run ready condition.

The engine is designed such that oil pressure to the bearing points is not necessary but rather a small flow of droplets are only required for proper lubrication. As mentioned above, all of the bearings are roller bearings, particularly the main crank bearings 594, 596; and the connecting rod bearing is a needle bearing 590 (FIG. 18). As also mentioned, the overhead cam bearings 607, 608 (FIG. 20) are also roller bearings. Thus a small amount of oil flow is adequate for the roller and needle bearings lubrication.

As described, engine 290 does not even have a traditional oil pump but rather, the oil is siphoned under the natural operational movement of the piston. With reference to FIGS. 10, 18 and 19, the engine lubrication will be described. It should be appreciated that in FIG. 10, piston 636 is shown in the top dead center (TDC) position. During the power stroke, piston 636 is forced downwardly and the reduction of volume in crank chamber 312 (together with the blow by gases around the piston) pressurizes crankcase chamber 312. Recall that only one port communicates between the crankcase 312 and the cam chain drive chamber 316, that is through port 522. Thus during the compression stroke, the gases in crankcase 312 exhausts through reed valve 650 (FIG. 23).

When the piston is at its lowest position, or bottom dead center (BDC), the piston begins to move upward, beginning the compression stroke compressing air and fuel within the compression chamber 314. The vacuum created within chamber 312 draws oil from the oil sump chamber 310 through filter 354 into passageway 362, 536, 766 and into passageway 570 within the crankshaft 542. This also draws oil into the internal volume 580 within pin 544 through passageway 572. Oil reaches the needle bearings 590 through aperture 582. The continued rotation of crankshaft 542 causes the centrifugal force on the oil to be released from the needle bearing 590 through passage ways 592 (FIG. 19) into crank chamber 312. In fact, once the engine is running, the centrifugal force of the oil together with the surface tension of the oil fluid, helps draw the oil through the aforementioned passages. It should also be appreciated that during the power stroke, the oil that is in the crank chamber 312 is exhausted through the reed valve 650 into chamber 316.

With reference again to FIG. 23, the oil level is shown at its natural level within chamber 316, and aperture 516 allows oil to seek a level within semi-circular wall 514. Rotation of the gears 566, 710 (FIG. 23) causes oil to be thrown onto rail 752 and to pool with the help of rail 754 and traverse down rail

756. The oil is thereafter picked up by chain 614 and carried through the crank housing 300, liner 304, and into the head 306.

Figure 30:
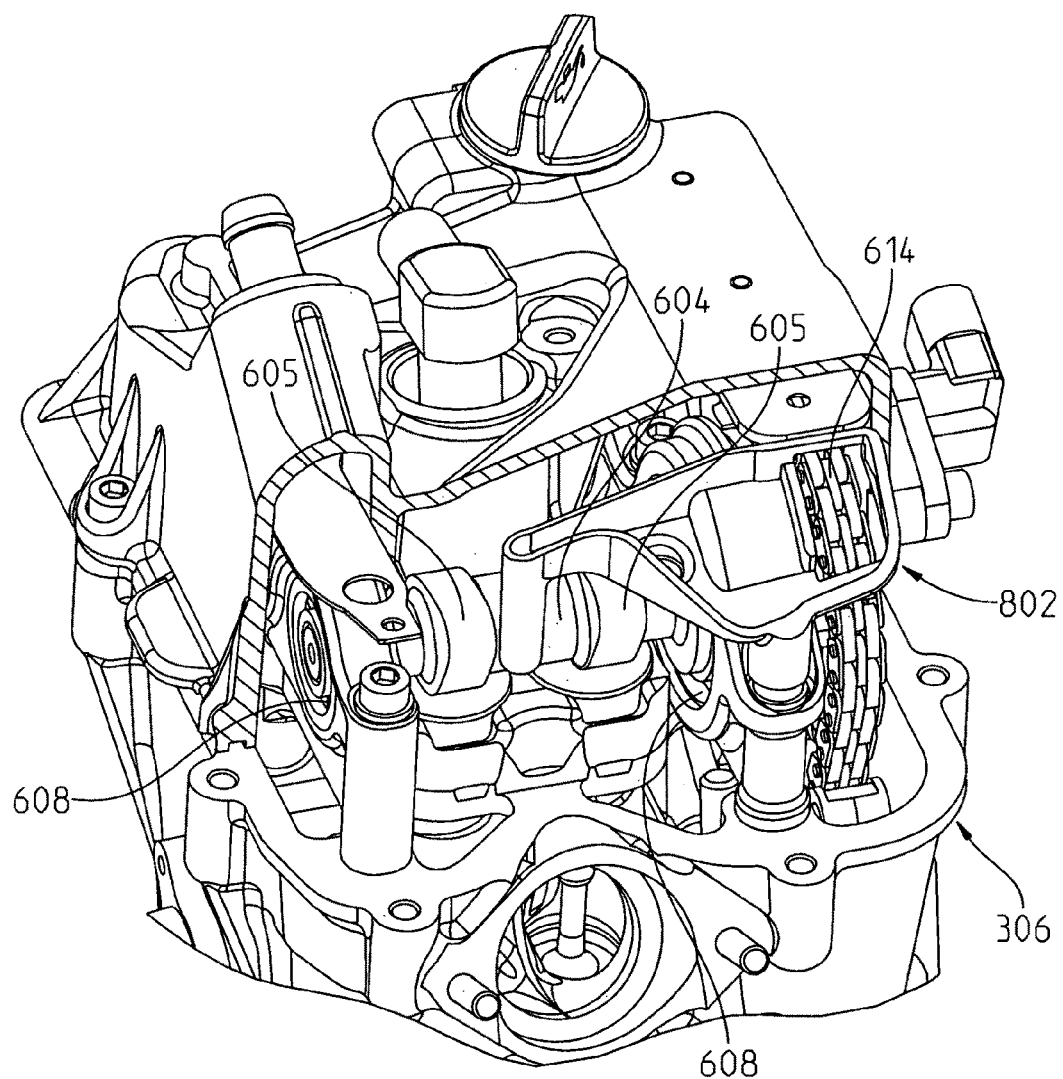
FIG. 30 shows a perspective view of the assembled valve cover with a portion of the outer cover member broken away to show the internal oil distribution mechanism.
Figure 31:
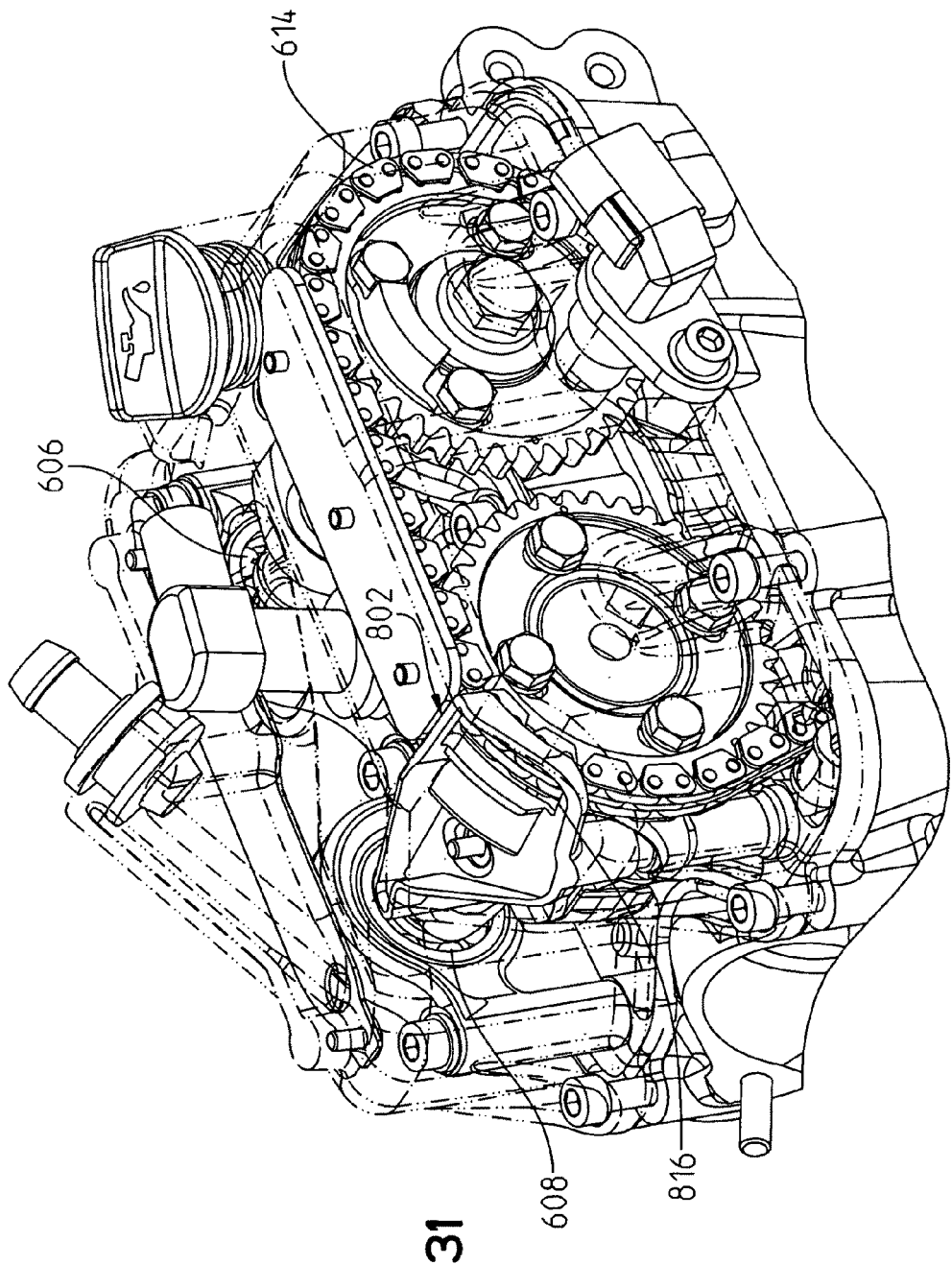
FIG. 31 is a perspective view similar to that of FIG. 30 showing the entire internal oil distribution mechanism within the valve cover.

With reference now to FIGS. 30 and 31, the lubrication within the head assembly 306 will be described. As shown first in FIG. 30, chain 614 throws oil into member 802 through window 816 and collects within member 802. Oil then drips through aperture 822 (FIGS. 26-27) and through opening 824 (FIG. 27) to lubricate lobes 605 on cam shaft 604. The rotation of the chain 614 together with the cam 602, 604, causes a spewing of the oil against rails 804, 806 (see FIG. 25) which causes droplets of oil to lubricate the lobes 603 of cam 602 (FIG. 20). Also, due to the inclination of the engine (see FIG. 7) that is, with oil distribution member 802 on the high side, oil is also distributed to lobes 603 of cam 602 (FIG. 20). The general spray of oil within valve cover 308 lubricates bearings 606, 608. Oil is returned to the cam chain chamber 316 through the chain access openings 512 (FIG. 16) and 634 (FIG. 20) and back to oil sump chamber 310 by way of aperture 530, which continues the lubrication cycle.

Figure 32:
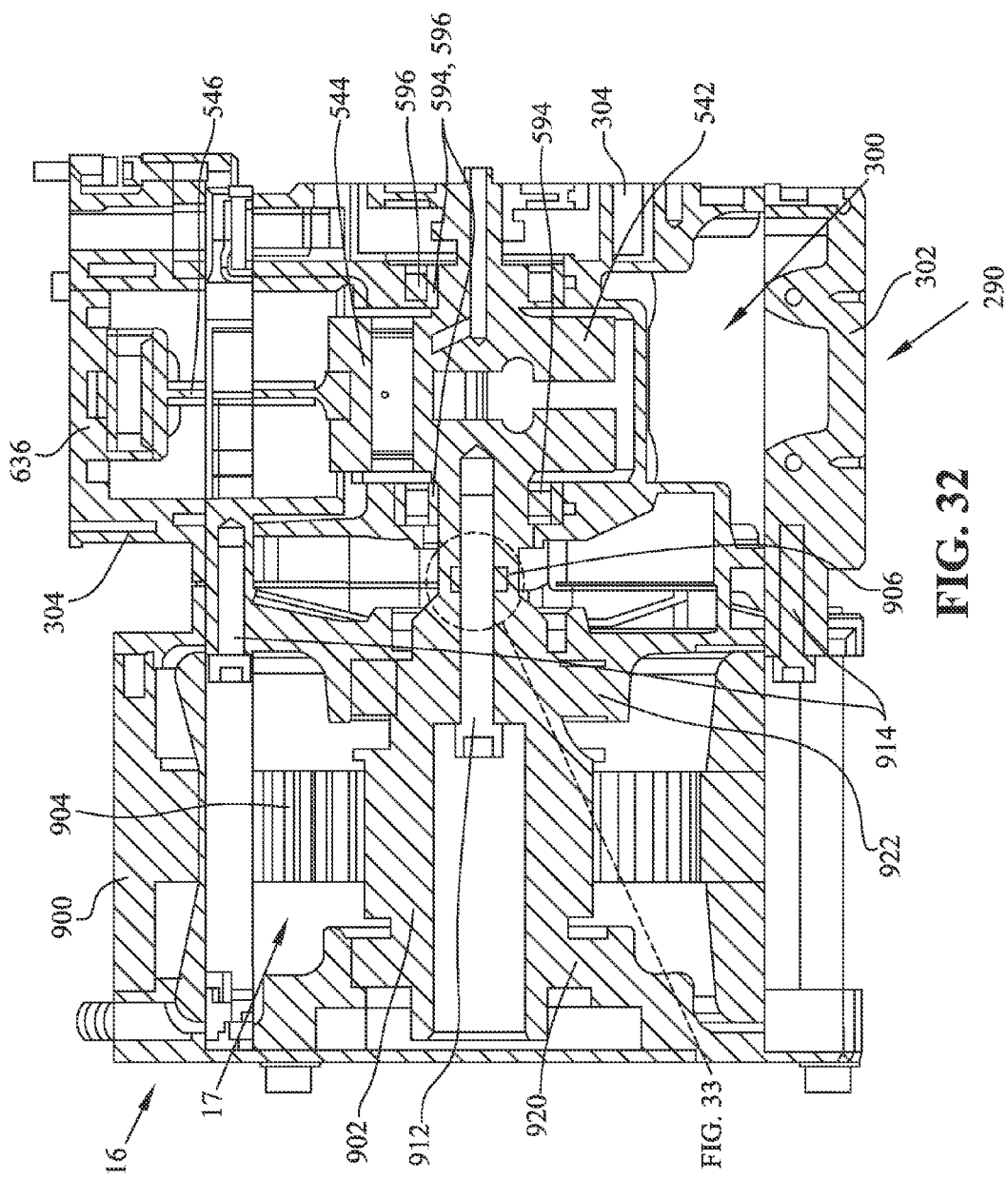
FIG. 32 shows a cross-sectional view of the engine and generator of FIG. 28.
Figure 34:
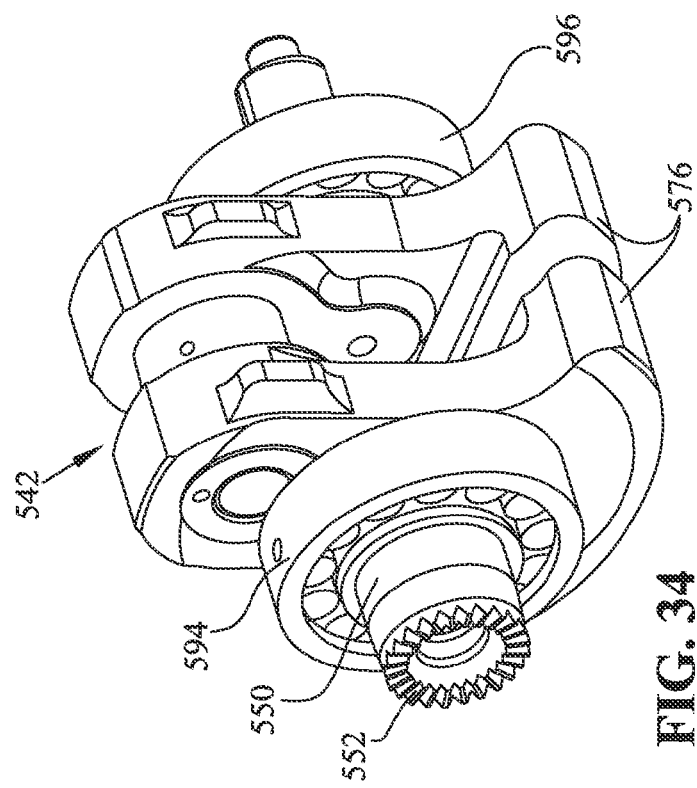
FIG. 34 shows the crank shaft of the combustion engine in a perspective representation.

With reference now to FIG. 32, a sectional view of the range extender with coupled single-cylinder engine 290, the generator 17 located on the left and the engine block of the combustion engine, here a single-cylinder engine, on the right. The generator 17 is located in a generator housing 900.

Of the combustion engine can be seen the crank shaft 542, the crank pin 544, the connecting rod 546, the piston 636 as well as the cylinder liner 304 and of the electric drive can be seen the likewise hollow rotor shaft 902 of the generator with the generator/rotor 904.

Figure 33:
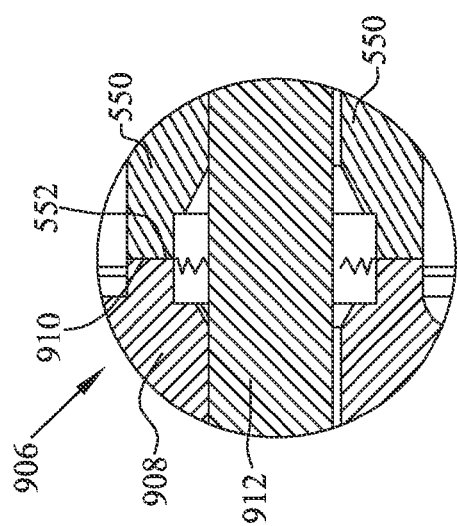
FIG. 33 shows an enlarged sectional view of the portion denoted in FIG. 32.

As can be seen from FIG. 33, the crank shaft 542 and the rotor shaft 902 are connected by a self-centering connection screw 906, whereby on the crank shaft, a stub shaft 550 with spur gearing 552 and on the rotor shaft 902 a corresponding shaft 908 with spur gearing 910 are arranged, whereas this serration is self-centering, and is known as a "Hirth-Serration". The two shafts are connected by a connecting screw 912 and the two housings 900 and 304 are connected by screws 914 without centering because the Hirth-Serration does the centering.

An advantageous consequence of such a connection is a substantial simplification of the bearings of the two shafts, which enables simple length adjustment of the shafts due to temperature changes. This construction only requires a fixed bearing 920 in the form of a ball bearing for the rotor shaft 902 and a first floating bearing 922 as ball bearing or roller bearing in the generator housing or inner ring as well as third and fourth floating bearings 594 and 596 as roller bearings without axial in-runs in the engine housing, whereas the inner ring is pressed on the crank shaft or the crank shaft directly serves as running surface for the floating bearing without inner ring. The floating bearings 594 and 596 can also be constructed as ball bearings with a slide fit in the housing or on the shaft.

From the above described arrangement of the coupling, numerous advantages result, such as simple assembly by only one screw through the hollow shaft of the generator; simple preassembly of the two components combustion engine and generator; the connection is configured such that the pre-stress force of the screw is in every situation bigger than the torque and bending moments generated by the combustion engine which work on the serration, thus achieving a very rigid connection and enabling use of the high rotary mass of the generator as engine flywheel mass.

As the serration is self-centering, additional centerings on the housing are omitted. In this manner, an over-determinacy in the assembly can be avoided and the concentricity as well as the alignment of the two aggregates is always achieved. In the axial direction, minor tolerances are possible.

The shaft connections are made first and subsequently the housings are screwed together. Due to the high precision of the Hirth-Serration in the axial direction, it is possible to fix the whole connected shaft with only one axial bearing, by which the known problems with respect to linear expansion due to temperature influence can be eliminated.

As the generator is very sensitive to the play both in radial and axial directions because of the efficiency of the windings and the permanent magnets, and as the efficiency drastically deteriorates with large play, it would be ideal if the generator could be aligned exactly and all of the linear expansion on the combustion engine could be absorbed and balanced in spite of the rigid connection. The axial alignment on the generator is important because the rotation speed and position measurement of the generator is read by a decoder/rotary encoder mounted on the end side. This decoder is not able to overcome long axial distances because of its design. The axial alignment of the generator housing and the generator shaft is thus preferably to be made on the side of the decoder.

For this reason, the combustion engine can be configured such that it can absorb all of the length extension of the connected shaft in the crankshaft drive. Crank shaft and connection rod have enough play in axial direction to absorb the extension. The axial bearing on the engine can be omitted. The crank shaft and the connection rod merely have an in-run for limitation in axial direction, which is only used in the pre-assembly state of the engine without the generator.

As soon as the engine and the generator are connected, the generator takes over the axial alignment. The bearings on the engine may be fabricated with ball bearings as floating bearings as set out in FIG. 35 or alternatively with roller bearings or spherical roller bearings. The connection rod has enough play on the piston pin to absorb the axial extension. Below, the connection rod passes between the crank webs. This leads to a compact combination of the aggregates, whereby the generator with its large rotary mass is used as flywheel on the combustion engine, thus resulting in a substantial weight saving and an optimization of installation space.

Figure 36:
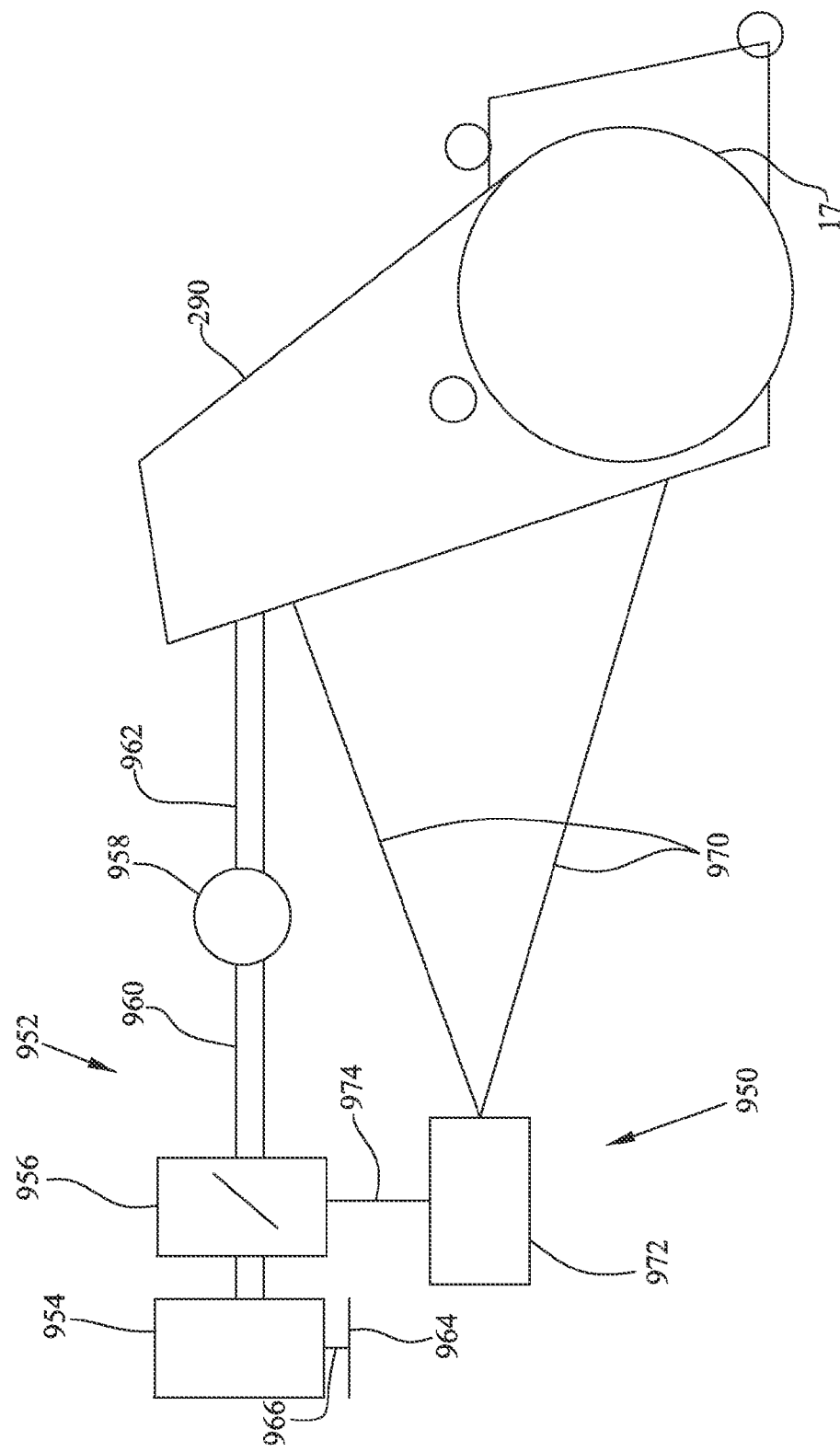
FIG. 36 shows a diagrammatical sketch of an engine dampening system for use with the above mentioned engine.

With reference now to FIG. 36, an engine dampening system 950 for engine 290 and generator 17 is shown. Engine 290 includes an air intake system 952 comprised of an air filter 954 coupled to throttle body 956 and to air manifold 958 by way of hoses 960, 962. As shown, air filter 954 is attached to frame 964 by way of a coupling mechanism shown generally at 966. Coupling mechanism 966 could be a direct connection onto the frame or could be a bracket of known construction. Without dampening system 950, engine 290 may vibrate causing vibration transfer to the air filter 954 and to frame 964 which may be felt by the driver and/or passengers. This vibration is enhanced by the remote location of the throttle body 956 which is coupled directly to engine 290.

Figure 37:
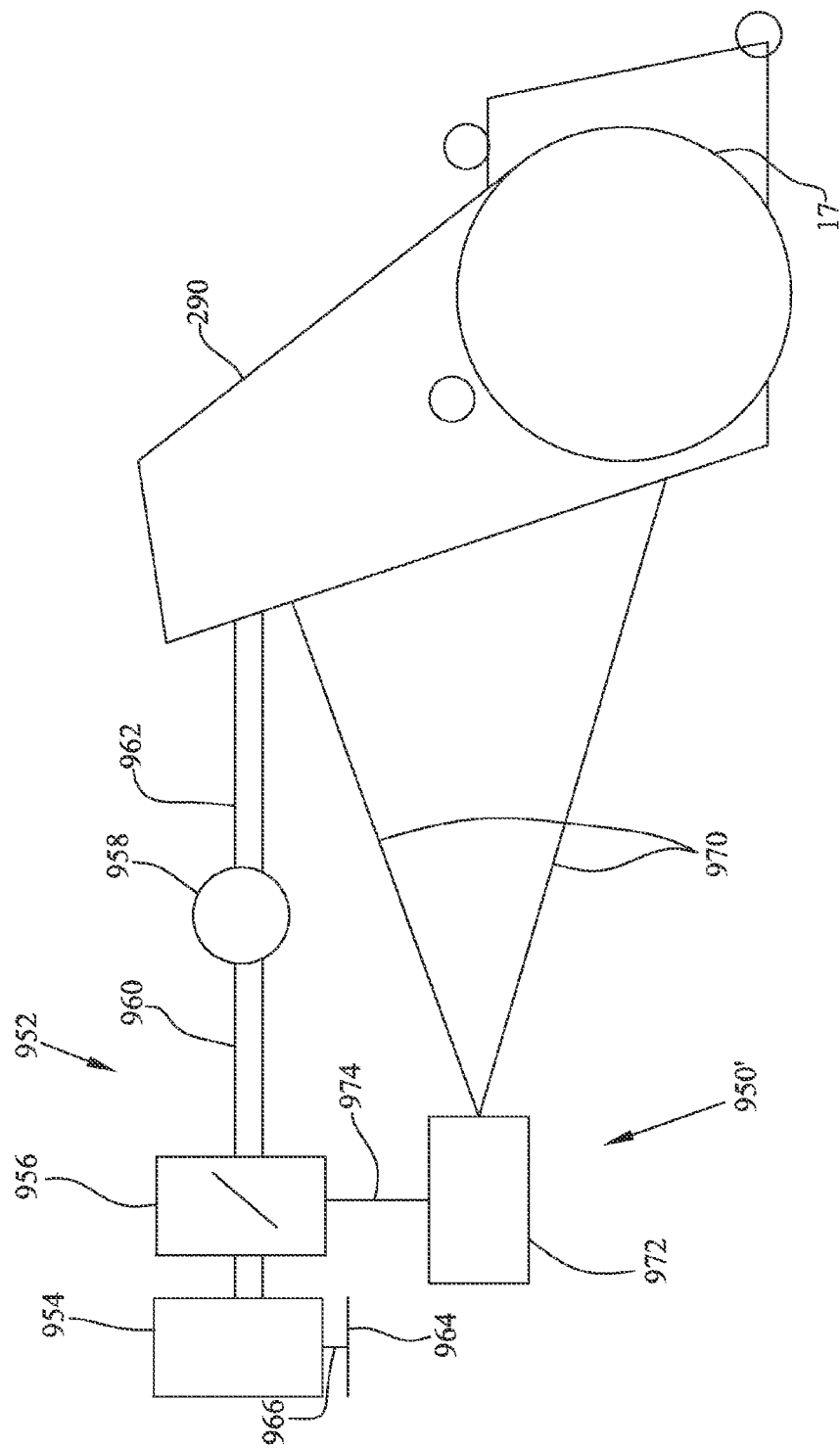
FIG. 37 shows a diagrammatical sketch of an alternate engine dampening system of the version shown in FIG. 36.

As shown vibration dampening system 950 is comprised of a plurality of support arms 970 rigidly connected to engine 290 and also coupled to a dampening weight 972. Dampening weight 972 may be connected only engine 290 as shown in FIG. 36, or may be directly and rigidly coupled to throttle body 956 by way of coupling 974, as shown in FIG. 37.

Figure 38:
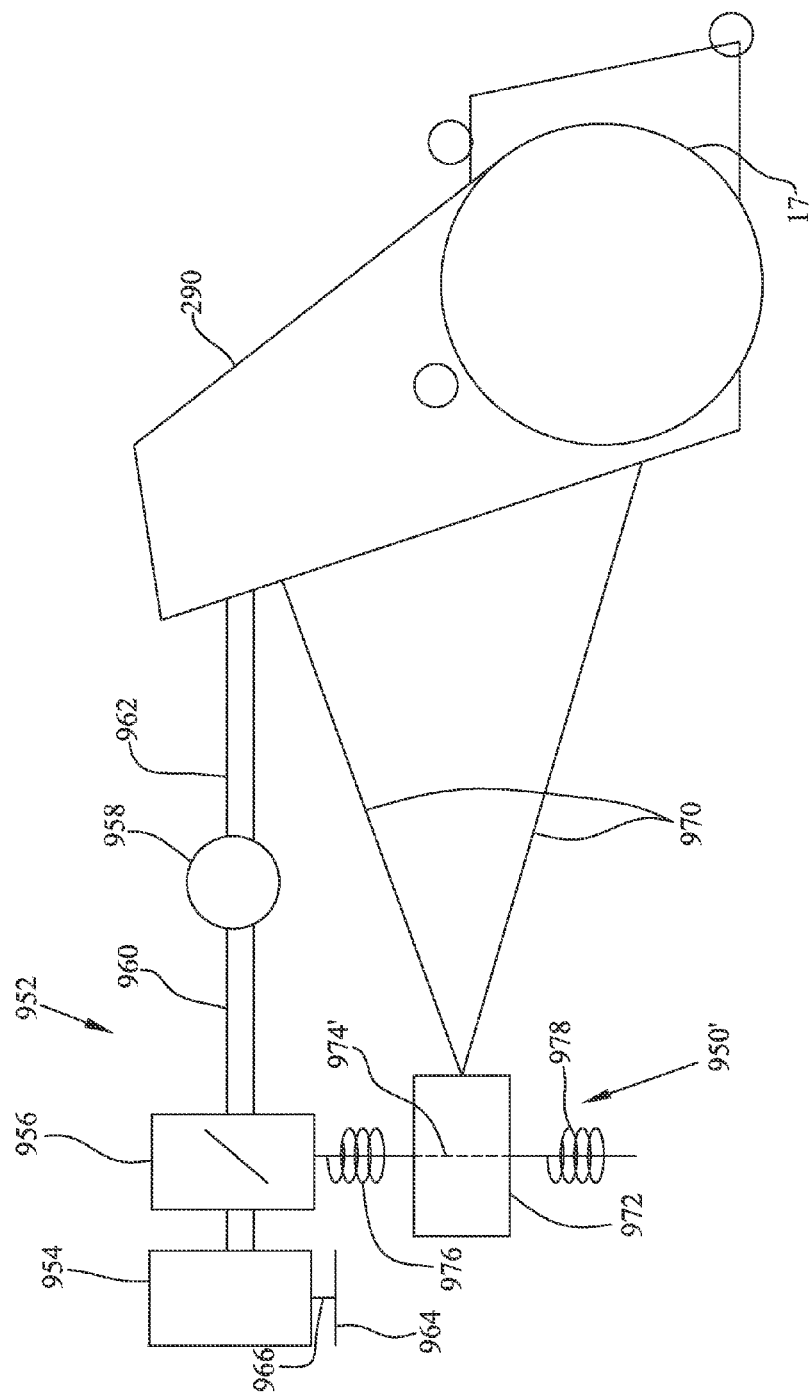
FIG. 38 shows a diagrammatical sketch of an alternate engine dampening system of the version shown in FIG. 36.

A further alternative as shown in FIG. 38, allows dampening weight 972 to be movable relative to throttle body 956 by way of coil springs 976, 978. In this example, rod 974' passes through mass 972, with springs on opposite sides of mass 972. For a single cylinder engine as shown herein, it has been found that a mass of approximately 6 KG is appropriate.

Thus as shown, vibration from engine 290 is transferred to dampening weight 972. In the embodiment of FIG. 36, the engine vibration alone is dampened, and in the embodiment of FIGS. 37 and 38, throttle body 956, due to its direct coupling to dampening weight 972 through coupler 974 is also dampened, and vibrates at the same frequency as weight 972 and engine 290. In all embodiments, less vibration is inherently transferred to frame 964.

What is claimed is:

1. A combustion engine, comprising:
   a crankcase defining a journal area and an oil sump;
   a cylinder communicating with the crankcase;
   a cam chain chamber discrete from the crankcase;
   a crankshaft journalled in the journal area of the crankcase, with a first end extending into the cam chain chamber and a second end extending through the crankcase;
   a piston positioned in the cylinder;
   a head above the cylinder having at least one camshaft therein operating valves in the head;
   a first gear positioned on the crankshaft first end and positioned in the cam chain chamber;
   a second gear positioned on an end of the cam;
   a chain entrained around the first and second gear; and
   an oil distribution member for distributing oil in the oil sump onto the cam chain for delivering lubrication oil to the head.

2. The combustion engine of claim 1, wherein the oil distribution member is positioned adjacent the first gear.

3. The combustion engine of claim 1, wherein the first gear is provided in a gear set positioned on the crankshaft first end, further comprising a third gear in meshing engagement with the gear set, and the oil distribution member is positioned intermediate the first and third gears.

4. The combustion engine of claim 1, further comprising a port communicating between the crankcase and the cam chain chamber; and a valve allowing the flow of blow by gases, compressed gases and oil into the cam chain chamber when the piston is moving from a top dead center position to a bottom dead center position.

5. The combustion engine of claim 1, wherein the camshaft operates on bearings in the heads.

6. The combustion engine of claim 5, wherein the bearings are roller bearings.

7. The combustion engine of claim 1, further comprising an oil distribution member within the head to deliver oil to the cam lobes.

8. The combustion engine of claim 1, wherein the oil distribution member is positioned in the cam chain chamber.

9. The combustion engine of claim 8, wherein the oil distribution member is positioned to collect oil from the first gear and to distribute the oil onto the cam chain.

10. The combustion engine of claim 1, wherein the oil distribution member includes a flange coupled to a wall of the engine.

11. The combustion engine of claim 1, wherein the oil distribution member is in a fixed position relative to the crankcase.

12. The combustion engine of claim 1, wherein the oil distribution member is decoupled from rotation of the first and second gears.

13. A combustion engine, comprising:
    a crankcase defining a journal area and an oil sump;
    a cylinder communicating with the crankcase;
    a cam chain chamber discrete from the crankcase;
    a crankshaft journalled in the journal area of the crankcase, with a first end extending into the cam chain chamber and a second end extending through the crankcase;
    a piston positioned in the cylinder;
    a head above the cylinder having at least one camshaft therein operating valves in the head;
    a first gear positioned on the crankshaft first end and positioned in the cam chain chamber;
    a second gear positioned on an end of the cam;
    a chain entrained around the first and second gear; and
    an oil distribution member within the head to deliver oil to the cam lobes.

14. The combustion engine of claim 13, wherein the oil distribution member is positioned adjacent the second gear.

15. The combustion engine of claim 13, wherein the oil distribution member comprises a tray positioned adjacent to the second gear which collects oil from the second gear.

16. The combustion engine of claim 15, wherein the tray includes at least one opening adjacent to cam lobes on the camshaft.

17. The combustion engine of claim 15, wherein the tray includes a window positioned adjacent to the second gear allowing oil to enter the tray from the rotating chain.

18. A combustion engine, comprising:
    a crankcase defining a journal area and an oil sump;
    a cylinder communicating with the crankcase;
    a crankshaft journalled in the journal area of the crankcase, the crankshaft having a first end and a second end;
    a piston positioned in the cylinder;
    a head above the cylinder having a camshaft therein operating at least one valve in the head;
    a first gear positioned on the first end of the crankshaft;
    a second gear positioned on an end of the cam;
    a chain entrained around the first gear and the second gear; and
    a tray positioned within the head to collect oil from the chain and to deliver the collected oil to the camshaft, wherein the tray includes a floor portion configured to collect the oil from the chain.

19. The combustion engine of claim 18, wherein the tray is positioned adjacent the second gear.

20. The combustion engine of claim 18, wherein the tray includes an opening positioned adjacent to the second gear allowing oil to enter the tray from the rotating chain.

21. The combustion engine of claim 18, wherein the camshaft includes a cam lobe, and the tray distributes the collected oil onto the cam lobe.

22. The combustion engine of claim 21, wherein the tray includes at least one opening adjacent to the cam lobe on the camshaft for distributing the oil onto the cam lobe.

* * * * *